United States Patent
Yamane et al.

(10) Patent No.: US 12,472,816 B2
(45) Date of Patent: Nov. 18, 2025

(54) TOUCH INPUT DEVICE AND METHOD OF MANUFACTURING OPERATION PANEL

(71) Applicant: Panasonic Intellectual Property Management Co., Ltd., Osaka (JP)

(72) Inventors: Shigeru Yamane, Osaka (JP); Tsuyoshi Tanaka, Kyoto (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 17 days.

(21) Appl. No.: 18/420,297

(22) Filed: Jan. 23, 2024

(65) Prior Publication Data

US 2024/0253464 A1 Aug. 1, 2024

(30) Foreign Application Priority Data

Jan. 31, 2023 (JP) .................. 2023-013590
Sep. 6, 2023 (JP) .................. 2023-144448

(51) Int. Cl.
*B60K 35/10* (2024.01)

(52) U.S. Cl.
CPC ...... *B60K 35/10* (2024.01); *B60K 2360/1438* (2024.01)

(58) Field of Classification Search
None
See application file for complete search history.

(56) References Cited

U.S. PATENT DOCUMENTS

| | | | | |
|---|---|---|---|---|
| 5,926,119 | A | * | 7/1999 | Lindeman ............... H04M 1/23 708/142 |
| 6,198,475 | B1 | * | 3/2001 | Kunimatsu ............ B60K 35/60 345/173 |
| 2010/0013786 | A1 | | 1/2010 | Nishikawa et al. |
| 2017/0147105 | A1 | * | 5/2017 | Kwon ................. G06F 3/03547 |

FOREIGN PATENT DOCUMENTS

| | | |
|---|---|---|
| JP | 2017174027 A | 9/2017 |
| WO | WO 2008111505 A1 | 9/2008 |

* cited by examiner

*Primary Examiner* — Ifedayo B Iluyomade
(74) *Attorney, Agent, or Firm* — Seed Intellectual Property Law Group LLP

(57) ABSTRACT

A touch input device includes: a first input area, a non-input area around the first input area, and an intermediate area between the first input area and the non-input area so as to surround the first input area, the first input area accepting an input operation, the non-input area accepting no input operation; and an input receiver that accepts at least an input to the first input area. The operation panel includes, three-dimensional elements on a surface the operation panel, the three-dimensional elements being are fine and raised or recessed, in each of the first input area, the non-input area, and the intermediate area. The three-dimensional elements in at least one of the intermediate area, the first input area, or the non-input area rein a shape different from a shape of the three-dimensional elements in other areas of the intermediate area, the first input area, and the non-input area.

16 Claims, 14 Drawing Sheets

First input area | Non-input area
Intermediate area

First input area | Intermediate area | Non-input area

TOUCH INPUT DEVICE AND METHOD OF MANUFACTURING OPERATION PANEL

CROSS REFERENCE TO RELATED APPLICATIONS

The present application is based on and claims priority of Japanese Patent Application No. 2023-013590 filed on Jan. 31, 2023, and Japanese Patent Application No. 2023-144448 filed on Sep. 6, 2023.

FIELD

The present disclosure relates to a touch input device and a method of manufacturing an operation panel.

BACKGROUND

Patent Literature (PTL) 1 discloses a protection panel has a function of accepting a touch input and includes: a window that accepts the touch input; and fine projections and recesses.

PTL 2 discloses a touch panel having a first texture at the edge of a touch invalid area, and a second texture at the edge of a touch valid area.

CITATION LIST

Patent Literature

PTL 1: International Patent Publication No. WO 2008/111505
PTL 2: Japanese Unexamined Patent Application Publication No. 2017-174027

SUMMARY

However, the protection panel according to PTL 1 can be improved upon.

The protection panel according to PTL 2 can also be improved upon.

The present disclosure provides a touch input device, and so on, capable of improving upon the above related art.

A touch input device according to an aspect of the present disclosure includes: an operation panel including a first input area that accepts an input operation, a non-input area that accepts no input operation, and an intermediate area, the non-input area surrounding the first input area, the intermediate area being interposed between the first input area and the non-input area so as to surround the first input area; and an input receiver that accepts at least an input to the first input area. The operation panel includes three-dimensional elements on a surface the operation panel in each of the first input area, the non-input area, and the intermediate area, the three-dimensional elements being fine and raised or recessed. The three-dimensional elements in at least one of the intermediate area, the first input area, or the non-input area are in a shape different from a shape of the three-dimensional elements in other areas of the intermediate area, the first input area, and the non-input area.

The present disclosure provides a method of manufacturing an operation panel of a touch input device. The method includes: forming, on a surface of the operation panel, a first input area, a non-input area around the first input area, and an intermediate area between the first input area and the non-input area so as to surround the first input area, the first input area accepting an input operation, the non-input area accepting no input operation; and forming three-dimensional elements that are fine and raised or recessed, in each of the first input area, the non-input area, and the intermediate area. The three-dimensional elements in at least one of the intermediate area, the first input area, or the non-input area are in a different shape. The three-dimensional elements in the intermediate area, in the first input area, and in the non-input area are transferred onto the surface of the operation panel, using a mold.

The present disclosure provides a method of manufacturing an operation panel of a touch input device. The method includes: forming, on a surface of the operation panel, a first input area, a non-input area around the first input area, and an intermediate area between the first input area and the non-input area so as to surround the first input area, the first input area accepting an input operation, the non-input area accepting no input operation; and forming three-dimensional elements that are fine and raised or recessed, in each of the first input area, the non-input area, and the intermediate area. The three-dimensional elements in at least one of the intermediate area, the first input area, or the non-input area are in a different shape. The three-dimensional elements in the intermediate area, in the first input area, and in the non-input area are formed on the surface of the operation panel by printing on a film or the surface of the operation panel.

A touch input device, and so on, according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
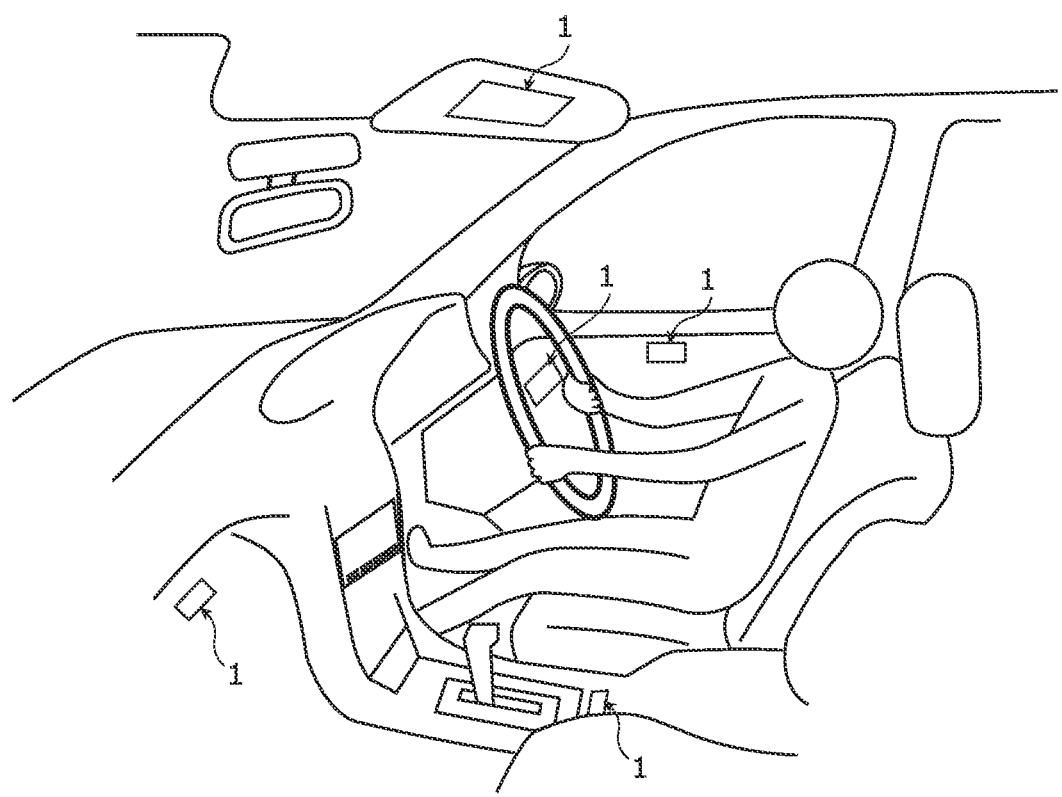
FIG. 1 is a schematic view showing a touch input device according to an embodiment.

An embodiment described below is a mere comprehensive and specific example of the present disclosure. The numerical values, shapes, materials, elements, the arrangement and connection of the elements, steps, step orders etc. shown in the following embodiment are thus mere examples, and are not intended to limit the scope of the present disclosure. Among the elements in the following embodiment, those not recited in the independent claims will be described as optional.

The figures are schematic representations and not necessarily drawn strictly to scale. The same reference signs represent substantially the same configurations in the drawings.

Now, the embodiment will be described in detail with reference to the drawings.

EMBODIMENT

[Configuration]

First, a configuration of touch input device 1 will be described with reference to FIGS. 1 to 5.

Figure 2:
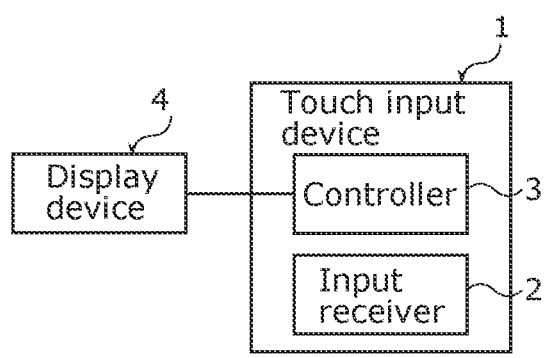
FIG. 2 is a block diagram showing the touch input device according to the embodiment and a display device.
Figure 3:
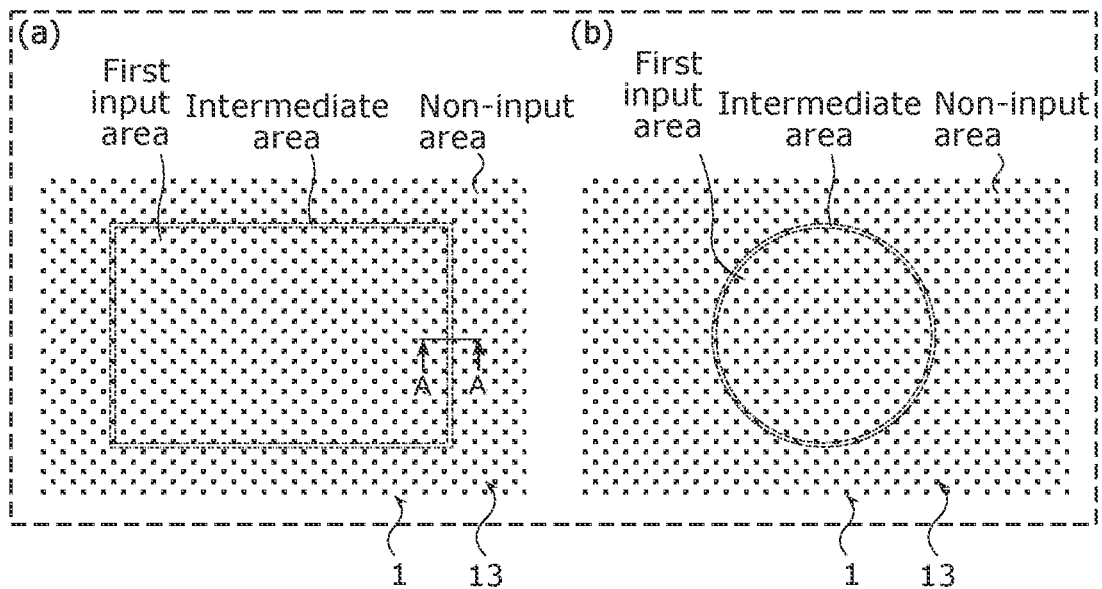
FIG. 3 shows a first input area, a non-input area around the first input area, and an intermediate area between the first input area and the non-input area so as to surround the first input area, on an operation panel of the touch input device.
Figure 4:
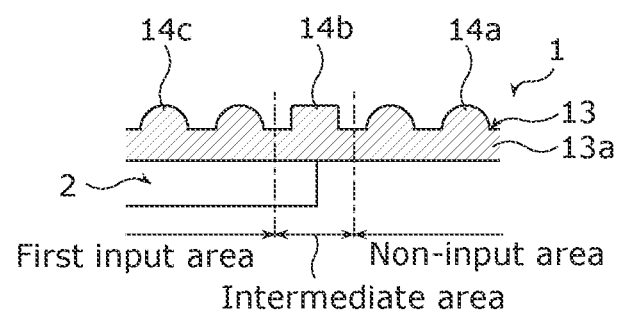
FIG. 4 is a cross-sectional view of the touch input device taken along the line A-A in FIG. 3.
Figure 5:
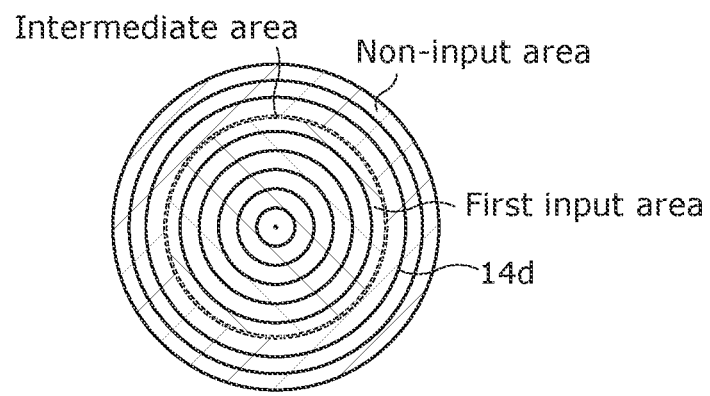
FIG. 5 is another view of the first input area, the non-input area, and the intermediate area of the operation panel.

FIG. 1 is a schematic view showing touch input device 1 according to the embodiment. FIG. 2 is a block diagram showing touch input device 1 according to the embodiment and display device 4. FIG. 3 shows a first input area, a non-input area around the first input area, and an intermediate area between the first input area and the non-input area so as to surround the first input area, on operation panel 13 of touch input device 1. FIG. 4 is a cross-sectional view of touch input device 1 taken along the line A-A in FIG. 3. FIG. 5 is another view of the first input area, the non-input area, and the intermediate area of operation panel 13.

As shown in FIG. 1, touch input device 1 is an operation input device for operating the functions displayed on display device 4. For example, touch input device 1 is used as an operation input device for display device 4 on a moving body, such as a vehicle or an aircraft, in a facility, or in any other suitable place. FIG. 1 illustrates touch input device 1 mounted on a vehicle. Specifically, touch input device 1 is placed on a steering wheel for steering, a center console, a door panel, an instrument panel, or any other suitable part of a vehicle. For improved design, operation panel 13 may be incorporated as a part of such a panel to provide an integrated and seamless appearance without joints.

Upon receipt of an operation input by a user using an operating body, touch input device 1 can operate display device 4 mounted on a vehicle. The operating body is a human finger, a touch pen, or any other suitable tool. Accordingly, display device 4 can display an image in accordance with the input operation.

Touch input device 1 includes a capacitive touch sensor, for example, as input receiver 2. Alternatively, touch input device 1 may include a touch sensor of a known type other than a capacitive type.

Specifically, as shown in FIGS. 2 to 4, touch input device 1 includes operation panel 13, input receiver 2, and controller 3.

Operation panel 13 is a cover in the shape of a rectangular plate or sheet. Operation panel 13 is stacked on input receiver 2 so as to cover input receiver 2. Accordingly, the user performs a trace operation or a touch operation on the surface of operation panel 13 using an operating body so as to input an operation to input receiver 2.

In a plan view, operation panel 13 is in a rectangular shape but may be any other polygonal shape or a circular shape.

For example, operation panel 13 is made of polycarbonate, acrylic, an acrylonitrile butadiene styrene (ABS) resin, or any other suitable material.

As shown in FIGS. 3 and 4, operation panel 13 includes the first input area, the non-input area around the first input area, and the intermediate area between the first input area and the non-input area so as to surround the first input area.

The first input area accepts an input operation. That is, when operation panel 13 and input receiver 2 are viewed in an overlapping manner, the first input area overlaps with input receiver 2. Accordingly, an operation input by the user on the surface of operation panel 13 in the first input area is acceptable by input receiver 2.

The first input area is located at the center of the surface of input receiver 2. This allows the user to easily input an operation in the first input area.

The non-input area accepts no input operation. That is, when operation panel 13 and input receiver 2 are viewed in an overlapping manner, the non-input area does not overlap with input receiver 2. Accordingly, an operation input by the user on the surface of operation panel 13 in the non-input area is inacceptable by input receiver 2.

The non-input area is in contact with the outer periphery of the intermediate area and located around the first input area and the intermediate area so as to surround the first input area and the intermediate area. That is, the non-input area is located at the outer edge of operation panel 13.

The intermediate area is in contact with the periphery of the first input area and interposed between the first input area and the non-input area so as to surround the first input area. When operation panel 13 and input receiver 2 are viewed in an overlapping manner, the intermediate area expands from input receiver 2 to the outside of input receiver 2 and across the boundary between input receiver 2 and the outside of input receiver 2. Accordingly, the intermediate area includes an area capable of accepting an input operation and an area capable of accepting noninput operation.

The intermediate area may be in the shape of a polygonal frame as shown in (a) of FIG. 3, or a ring shape as shown in (b) of FIG. 3. While described in the shape of a rectangular frame in (a) of FIG. 3, the intermediate area may be in the shape of any other polygonal frame.

Note that the intermediate area may include only one of the area capable of accepting an input operation and the area capable of accepting no input operation. Being located only in an area capable of accepting an input operation, the intermediate area extends along the outer edge of input receiver 2, when operation panel 13 and input receiver 2 are viewed in an overlapping manner.

Operation panel 13 has, on the surface thereof, three-dimensional elements 14c, 14a, and 14b, which are fine and raised or recessed, in the first input area, in the non-input area, and in the intermediate area, respectively. FIG. 4 illustrates three-dimensional hemispherical elements 14a, 14b, and 14c.

Fine three-dimensional elements 14a, 14b, and 14c are regularly or randomly aligned, raised or recessed elements less than several centimeters. For example, three-dimensional elements 14a, 14b, and 14c are conical, truncated, columnar, hemispherical elements. Alternatively, three-dimensional elements 14a, 14b, and 14c may be each in a wave pattern with a square wave or a sine wave cross-section.

The recessed elements include discretely aligned recessed elements, and continuous groove elements. On the other hand, the raised elements include discretely aligned raised elements and continuous wall elements. FIG. 5 illustrates three-dimensional elements 14d each in the shape of a wall. That is, three-dimensional elements 14b in the intermediate area, three-dimensional elements 14c in the first input area, and three-dimensional elements 14a in the non-input area may be each a circular groove, a polygonal groove, a circular wall, or a polygonal wall. Note that the intermediate area is not necessarily in a closed shape as shown in (a) and (b) of FIG. 3, and may be in a linear or curved shape extending vertically in (a) of FIG. 3, for example.

Fine three-dimensional elements 14a, 14b, and 14c are not necessarily in the shapes described above. As an example, the fine three-dimensional elements may include regularly aligned three-dimensional geometric elements, or three-dimensional geometric elements obtained by continuously aligning irregular projections and recesses. Examples may include three-dimensional elements obtained by regularly aligning raised and recessed triangles, in other words, three-dimensional elements obtained by overlapping grids and diagonal grids. Examples may further include three-dimensional elements obtained by regularly aligning raised and recessed rectangles, that is, three-dimensional elements in a lattice. Examples may further include three-dimensional elements obtained by regularly aligning raised and recessed hexagons, that is, three-dimensional elements in a honeycomb pattern. Examples may further include three-dimensional elements obtained by regularly aligning raised and recessed triangular pyramids. Examples may further include three-dimensional geometric elements obtained by continuously aligning irregular projections and recesses having a plurality of types of polygonal planes in combination. Examples may further include three-dimensional elements obtained by aligning, in a lattice, geometric designs obtained by overlapping rectangle frames with projections and recesses to gradually increase in size.

As another example, the fine three-dimensional elements may include irregular projections and recesses. Examples may include three-dimensional elements including raised or recessed, irregular curves. Examples may further include irregular, three-dimensional raised and recessed elements in a rock pattern. Examples may further include irregular, three-dimensional raised or recessed elements in a mesh pattern.

As further another example, the fine three-dimensional elements may be well-designed three-dimensional elements including regular projections and recesses. Examples may include three-dimensional raised and recessed elements obtained by aligning fiber bands in a lattice. Examples may further include three-dimensional raised or recessed elements obtained by regularly aligning specific emblem designs attached to rectangular frames. Examples may further include three-dimensional raised or recessed elements obtained by regularly aligning waved mesh patterns. Examples may further include three-dimensional raised or recessed elements obtained by regularly aligning curve designs. Examples may further include three-dimensional raised or recessed elements obtained by continuously arranging a plurality of similar streamline designs.

Three-dimensional elements 14b, 14c, or 14a in at least one of the intermediate area, the first input area, or the non-input area are in a shape different from the shape of the three-dimensional elements in the other areas.

Specifically, as shown in FIG. 4, operation panel 13 includes three-dimensional elements 14a, 14b, and 14c that are projections from base 13a. Three-dimensional elements 14c in the first input area and three-dimensional elements 14a in the non-input area are three-dimensional hemispherical raised elements. In this embodiment, three-dimensional elements 14c in the first input area and three-dimensional elements 14a in the non-input area are in the same shape. On the other hand, three-dimensional elements 14b in the intermediate area are three-dimensional cylindrical or pyramidal raised elements. In this embodiment, three-dimensional elements 14b in the intermediate area are different from three-dimensional elements 14c in the first input area and three-dimensional elements 14a in the non-input area.

The surface of operation panel 13 may be matte so that three-dimensional elements 14b in the intermediate area are less conspicuous than three-dimensional elements 14c in the first input area and three-dimensional elements 14a in the non-input area.

As seen in an overlapping manner with operation panel 13, input receiver 2 overlaps with at least the first input area. That is, input receiver 2 is in a position corresponding to the first input area so as to accept an operation input by the user to the first input area of operation panel 13. Accordingly, input receiver 2 accepts at least an input to the first input area.

In this embodiment, as seen in an overlapping manner with operation panel 13, input receiver 2 overlaps with a part of the intermediate area. That is, input receiver 2 is located in a position corresponding to the part of the intermediate area so as to accept an operation input by the user to the intermediate area of operation panel 13. In this embodiment, the part of the intermediate area corresponds to the inner periphery of the intermediate area which is closer to the first input area. Accordingly, input receiver 2 accepts an input in the part of the intermediate area.

Input receiver 2 is a touch sensor that outputs, to controller 3, a signal corresponding to the operation input by the user using an operating body and accepted.

Controller 3 obtains the signal output from input receiver 2, and controls display device 4 based on the obtained signal. Controller 3 specifies the point of input by the operating body, for example, based on a change in the capacitance at input receiver 2 as indicated by the signal. Based on the specified point of input, controller 3 performs control of and communication with display device 4. Such controller 3 is a dedicated control circuit or a general-purpose processor, for example.

Such operation panel 13 in this embodiment can be obtained by, for example, injection molding using molds. Specifically, two molds are prepared. One of the molds has a surface on which three-dimensional elements 14b in the intermediate area, three-dimensional elements 14c in the first input area, and three-dimensional elements 14a in the non-input area are finely processed. The other mold is for forming base 13a of operation panel 13. These two molds are combined and a resin is injected inside, which provides operation panel 13 with a surface on which these three-dimensional elements 14b, 14c, and 14a are transferred.

As another method, the following provides operation panel 13 on which the three-dimensional elements are transferred. A liquid resin is thinly applied on the surface of a mold in advance. After the applied liquid resin has been cured, a resin as a base material is injected inside the mold and integrally molded.

Operation panel 13 in this embodiment may be available by pressing a mold onto a film, for example. Specifically, a mold is prepared on which three-dimensional elements 14b in the intermediate area, three-dimensional elements 14c in the first input area, and three-dimensional elements 14a in the non-input area can be transferred. By pressing this mold onto a film, three-dimensional elements 14b in the intermediate area, three-dimensional elements 14c in the first input area, and three-dimensional elements 14a in the non-input area are formed on the surface of the film. This film is bonded or insert-molded to be stacked on the surface, which serves as the base, of operation panel 13. This provides operation panel 13 with a film on which three-dimensional elements 14b in the intermediate area, three-dimensional elements 14c in the first input area, and three-dimensional elements 14a in the non-input area are transferred. Note that operation panel 13 with three-dimensional elements 14b, 14c, and 14a is available by directly pressing a heated mold onto the surface of a resin panel and thermally deforming the surface.

Operation panel 13 in this embodiment may be available by printing on a film, for example. Specifically, printing equipment is used which stores data on three-dimensional elements 14b in the intermediate area, three-dimensional elements 14c in the first input area, and three-dimensional elements 14a in the non-input area. Accordingly, three-dimensional elements 14b in the intermediate area, three-dimensional elements 14c in the first input area, and three-dimensional elements 14a in the non-input area are formed on the surface of the film by printing (e.g., screen printing, offset printing, relief printing, gravure printing, or inkjet printing). This film is stacked on the surface, which serves as the base, of operation panel 13, by bonding or insert injection molding. This provides operation panel 13 with a film on which three-dimensional elements 14b in the intermediate area, three-dimensional elements 14c in the first input area, and three-dimensional elements 14a in the non-input area are printed. Note that three-dimensional elements 14b, 14c, and 14a can be directly printed on the surface of the panel surface.

Advantageous Effects

Next, the advantageous effects of touch input device 1 and the method of manufacturing operation panel 13 according to this embodiment will be described.

For example, on the protection panel of the background art, an apparent difference in the appearance is recognized between an area with fine projections and recesses and an area without the fine projections and recesses. In addition, on the protection panel of the background art, areas with different textures are provided near the boundary between the touch input receiver and the non-touch input receiver. Since the surface shapes are different, the boundary between the areas of different textures may be conspicuous. To address the problem, as described above, touch input device 1 according to this embodiment includes: operation panel 13 including a first input area, a non-input area around the first input area, and an intermediate area between the first input area and the non-input area so as to surround the first input area; and input receiver 2 that accepts at least an input to the first input area. The first input area accepts an input operation. The non-input area accepts no input operation. Three-dimensional elements 14c, 14a, and 14b, which are fine and raised or recessed, are formed in the first input area, the non-input area, and the intermediate area, respectively, on the surface of operation panel 13. Three-dimensional elements 14b, 14c, or 14a in at least one of the intermediate area, the first input area, or the non-input area are in a shape different from the shape of the three-dimensional elements in the other areas.

In this manner, three-dimensional elements 14b, 14c, or 14a in at least one of the intermediate area, the first input area, or the non-input area are slightly different. The area with the different structure thus becomes less conspicuous. Accordingly, when the user sees touch input device 1, the at least one of fine three-dimensional elements 14a, 14b, or 14c in the different shapes are less conspicuous, which provides a seamless appearance.

Three-dimensional elements 14b, 14c, or 14a in at least one of the intermediate area, the first input area, or the non-input area are in a shape different from the shape of the three-dimensional elements in the other areas. Accordingly, the user can recognize the difference in a sense of touch, when the operating body in a trace operation on touch input device 1 deviates from the first input area toward the non-input area.

Touch input device 1 includes the less conspicuous intermediate area between the input area (i.e., the first input area) and the non-input area. This maintains the well-designed surface of touch input device 1 and allows the user to recognize this boundary with a sense of touch.

Touch input device 1 according to the present disclosure is for operating the screen of display device 4 in a passenger compartment and may be applied to a steering wheel, a door panel, a center console, an instrument panel, or in any other suitable place. In this case, touch input device 1 with a seamless appearance is advantageously applied to the passenger compartment of a vehicle.

This embodiment provides a method of manufacturing operation panel 13 of touch input device 1. The method includes: forming, on a surface of operation panel 13, a first input area, a non-input area around the first input area, and an intermediate area between the first input area and the non-input area so as to surround the first input area; and forming three-dimensional elements 14c, 14a, and 14b, which are fine and raised or recessed, in the first input area, the non-input area, and the intermediate area, respectively.

The first input area accepts an input operation. The non-input area accepts no input operation. Three-dimensional elements 14b, 14c, or 14a in at least one of the intermediate area, the first input area, or the non-input area are in a shape different from the shape of the three-dimensional elements in the other areas. Three-dimensional elements 14b in the intermediate area, three-dimensional elements 14c in the first input area, and three-dimensional elements 14a in the non-input area are transferred onto the surface of operation panel 13, using a mold.

The method of manufacturing this operation panel 13 provides the less conspicuous intermediate area between the input area and the non-input area. This provides operation panel 13 that maintains the well-designed surface of touch input device 1 and allows the user to recognize this boundary with a sense of touch.

In the method of manufacturing operation panel 13 according to this embodiment, three-dimensional elements 14b in the intermediate area, three-dimensional elements 14c in the first input area, and three-dimensional elements 14a in the non-input area are transferred onto the surface of operation panel 13 by injection molding using a mold.

The method of manufacturing this operation panel 13 also provides at least the same advantages as described above.

In the method of manufacturing operation panel 13 according to this embodiment, three-dimensional elements 14b in the intermediate area, three-dimensional elements 14c in the first input area, and three-dimensional elements 14a in the non-input area are transferred onto the surface of operation panel 13 by pressing a mold onto a film or the surface of operation panel 13.

The method of manufacturing this operation panel 13 also provides at least the same advantages as described above.

In the method of manufacturing operation panel 13 according to this embodiment, three-dimensional elements 14b in the intermediate area, three-dimensional elements 14c in the first input area, and three-dimensional elements 14a in the non-input area are transferred onto the surface of operation panel 13 by curing a resin, which has been applied onto the surface of a mold.

The method of manufacturing this operation panel 13 also provides at least the same advantages as described above.

This embodiment provides a method of manufacturing operation panel 13 of touch input device 1. The method includes: forming, on the surface of operation panel 13, a first input area, a non-input area around the first input area, and an intermediate area between the first input area and the non-input area so as to surround the first input area; and forming three-dimensional elements 14c, 14a, and 14b, which are fine and raised or recessed, in the first input area, the non-input area, and the intermediate area, respectively. The first input area accepts an input operation. The non-input area accepts no input operation. Three-dimensional elements 14b, 14c, or 14a in at least one of in the intermediate area, the first input area, or the non-input area are in a shape different from the shape of the three-dimensional elements in the other areas. Three-dimensional elements 14b in the intermediate area, three-dimensional elements 14c in the first input area, and three-dimensional elements 14a in the non-input area are formed on the surface of operation panel 13 by printing on a film or the surface of the operation panel.

The method of manufacturing this operation panel 13 also provides at least the same advantages as described above.

In touch input device 1 according to this embodiment, the intermediate area accepts an input operation.

That is, when input receiver 2 and operation panel 13 are viewed in an overlapping manner, the intermediate area overlaps with input receiver 2. Accordingly, the operator recognizes, with a sense of touch, that the operating body is coming out of the first input area and the intermediate area corresponding to input receiver 2. The operator can then stop the trace operation, correct the point of the operating body, and restart the trace operation from another point.

In touch input device 1 according to this embodiment, three-dimensional elements 14b in the intermediate area are different from three-dimensional elements 14c in the first input area and three-dimensional elements 14a in the non-input area.

In this configuration, fine three-dimensional elements 14b in the intermediate area are interposed between three-dimensional elements 14c in the first input area and three-dimensional elements 14a in the non-input area. When touch input device 1 is no in use, for example, three-dimensional elements 14b in the intermediate area are in a slightly different shape from three-dimensional elements 14b in the first input area and three-dimensional elements 14a in the non-input area so that the intermediate area is less conspicuous. When touch input device 1 is viewed, fine three-dimensional elements 14b in the intermediate area are less conspicuous, which provides a seamless appearance.

In touch input device 1 according to this embodiment, three-dimensional elements 14b in the intermediate area, three-dimensional elements 14c in the first input area, and three-dimensional elements 14a in the non-input area are circular grooves, polygonal grooves, circular walls, or polygonal walls in a plan view of operation panel 13.

This case also provides at least the same advantages as described above.

In touch input device 1 according to this embodiment, the surface of operation panel 13 is matte.

Accordingly, three-dimensional elements 14b, 14c, or 14a in at least one of the intermediate area, the first input area, or the non-input area are in a slightly different shape that is less conspicuous.

Note that this embodiment includes following Variations 1 to 9.

[Variation 1]

First, this variation will be described with reference to FIG. 6.

Figure 6:
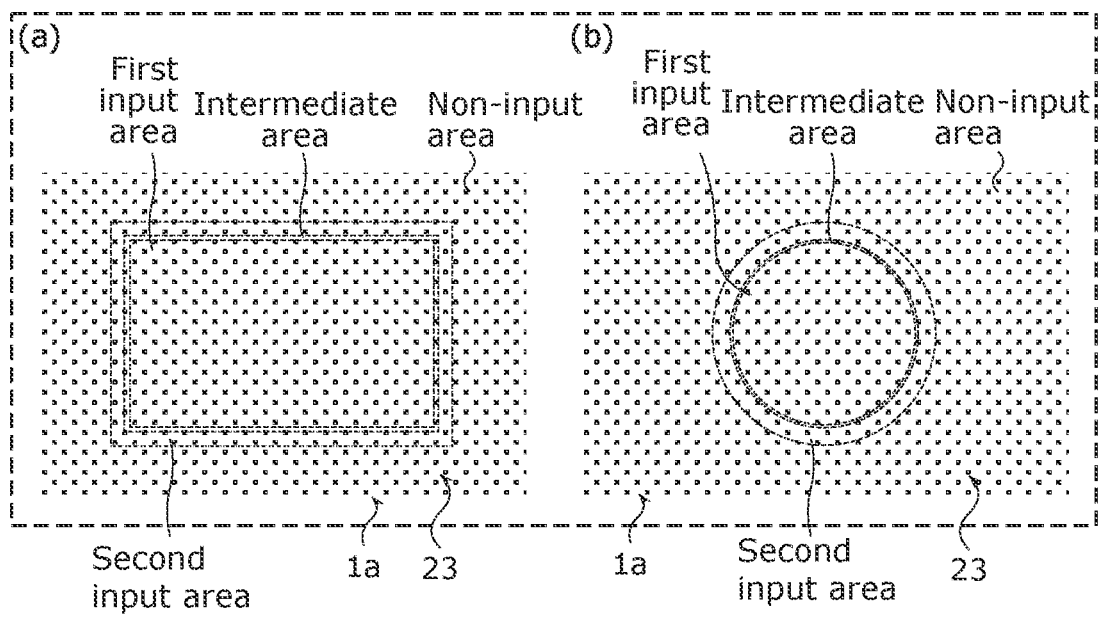
FIG. 6 shows a first input area, a non-input area around the first input area, and an intermediate area between the first input area and the non-input area so as to surround the first input area of the operation panel of a touch input device according to Variation 1.

FIG. 6 shows a first input area, a non-input area around the first input area, and an intermediate area between the first input area and the non-input area so as to surround the first input area, on operation panel 23 of touch input device 1a according to Variation 1. In FIG. 6, (a) illustrates the first input area and the non-input area each in a rectangular shape, and the intermediate area in the shape of a rectangular frame. In FIG. 6, (b) illustrates the first input area and the non-input area each in a circular shape, and the intermediate area in a ring shape. Note that (a) and (b) of FIG. 6 are mere examples, and each area may be in a polygonal or any other known shape.

In Embodiment 1, the intermediate area expands across the boundary between the input receiver and the outside of the input receiver when the operation panel and the input receiver are viewed in an overlapping manner. As shown in (a) and (b) of FIG. 6, operation panel 23 according to this variation includes the intermediate area closer to the inside (i.e., the first input area) than the boundary. In other words, the intermediate area is closer to the outer edge of input receiver 2, when operation panel 23 and input receiver 2 are viewed in an overlapping manner.

In this case, a second input area that accepts an input operation is interposed between the intermediate area and the non-input area. When operation panel 23 and input receiver 2 are viewed in an overlapping manner, the second input area is on the outer periphery and in contact with the intermediate area and closer to the outer edge of input receiver 2. Like the first input area, the second input area accepts an operation input by a user using an operating body.

Such a second input area has a width ranging from about 10 mm to about 50 mm, for example.

In touch input device 1a according to this variation, the second input area that accepts an input operation is interposed between the intermediate area and the non-input area.

Accordingly, when input receiver 2 and operation panel 23 are viewed in an overlapping manner, the intermediate area is more inward than the edge of input receiver 2. Accordingly, touch input device 1a has an information function that causes the operator to recognize the following with a sense of touch. The operating body is coming out of the first input area and the intermediate area corresponding to input receiver 2. The operator can then stop the trace operation, correct the point of the operating body, and restart the trace operation from another point.

Even when the operating body comes out of the first input area and the intermediate area, the operator can continue inputting an operation using the operating body in the second input area. This reduces the interruption of the trace operation using the operating body. As a result, there is less need to cause the user to input the same operation again.

[Variation 2]

First, this variation will be described with reference to FIG. 7.

Figure 7:
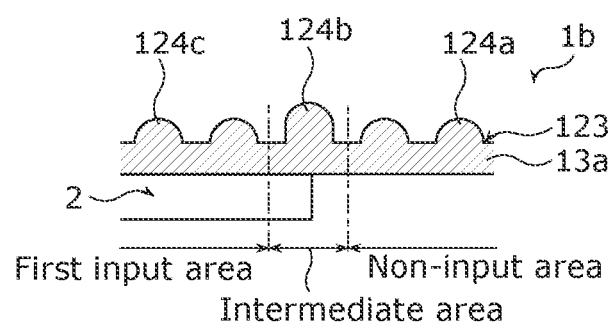
FIG. 7 is a cross-sectional view of a touch input device according to Variation 2.

FIG. 7 is a cross-sectional view of touch input device 1b according to Variation 1.

In Embodiment 1, the three-dimensional elements in the first input area, in the intermediate area, and in the non-input area are raised and have almost the same height. As shown in FIG. 7, on operation panel 123 according to this variation, three-dimensional elements 124b in the intermediate area have a height different from a height of three-dimensional elements 124c in the first input area and three-dimensional elements 124a in the non-input area.

Specifically, there is the height difference, that is, the gap of three-dimensional elements 124c in the first input area and three-dimensional elements 124a in the non-input area from three-dimensional elements 124b in the intermediate area. In one preferred embodiment, the gap is such a height that the operating body is less caught by the gap in the trace operation and the gap is less conspicuous. For example, three-dimensional raised elements 124b in the intermediate area may have a height twice or less the height of three-dimensional raised elements 124c in the first input area and three-dimensional raised elements 124a in the non-input area in one preferred embodiment.

The size of the gap may depend on the size, height, and pitch of the three-dimensional elements. In this case, the size of the gap may be set as appropriate within a range from several micrometers to several millimeters.

In this variation, the gap of the points in slightly different shapes is set within a range from about 0.1 mm to about 0.6 mm so as to be less conspicuous and to be recognized with a sense of touch.

In this variation, assume that three-dimensional elements 124c in the first input area, three-dimensional elements 124b in the intermediate area and three-dimensional elements 124a in the non-input area are each in a cylindrical shape. In this case, as a mere example, three-dimensional elements 124c in the first input area and three-dimensional elements 124a in the non-input area are cylinders with a diameter of 2.5 mm and a height of 1 mm at a pitch of 5 mm. Three-dimensional elements 124b in the intermediate area are cylinders with a diameter of 2.5 mm and a height ranging from 1.1 mm to 1.6 mm at a pitch of 5 mm.

In touch input device 1b according to such a variation, three-dimensional elements 124b in the intermediate area have a height greater than a height of three-dimensional elements 124c in the first input area and three-dimensional elements 124a in the non-input area.

Accordingly, in a trace operation, the user recognizes the following with a sense of touch through the operating body. Three-dimensional elements 124b in the intermediate area are in a different shape from three-dimensional elements 124c in the first input area and three-dimensional elements 124a in the non-input area. That is, the provided slight gap allows the user to recognize the intermediate area on the boundary between input receiver 2 and the outside of input receiver 2.

[Variation 3]

First, this variation will be described with reference to FIGS. 8A, 8B, and 9.

Figure 8A:
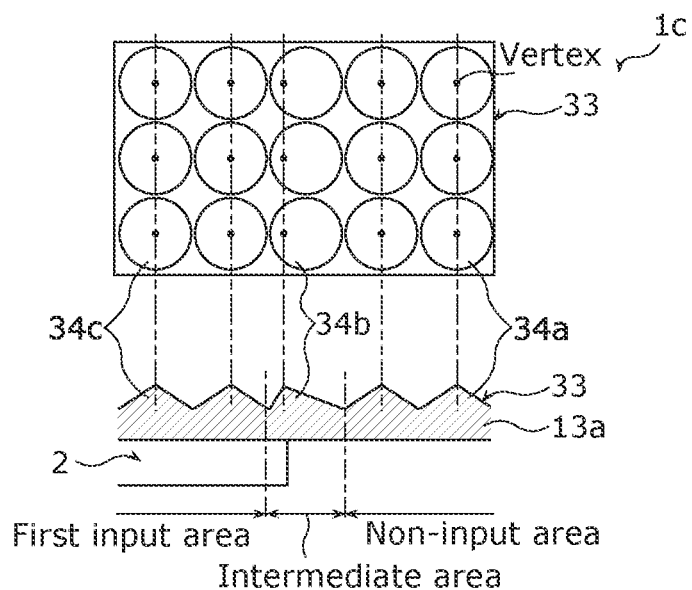
FIG. 8A includes a plan view and a cross-sectional view of a touch input device according to Variation 3.

FIG. 8A includes a plan view and a cross-sectional view of touch input device 1c according to Variation 3. FIG. 8B includes a plan view and a cross-sectional view of another touch input device 1c1 according to Variation 3. FIG. 9 includes a plan view and a partially enlarged view of touch input device 1c according to Variation 3. In FIG. 9, (a) illustrates the first input area and the non-input area each in a rectangular shape, and the intermediate area in the shape of a rectangular frame. In FIG. 9, (b) illustrates the first input area and the non-input area each in a circular shape, and the intermediate area in a ring shape. Note that (a) and (b) of FIG. 9 are mere examples, and each area may be in a polygonal or any other known shape.

In Embodiment 1, the three-dimensional raised elements in the first input area, the intermediate area, and the non-input area are each in a hemispherical or cylindrical shape, for example. On the other hand, as shown in FIG. 8A, on operation panel 33 according to this variation, three-dimensional raised elements 34c, 34b, and 34a in the first input area, the intermediate area, and the non-input area are each a conical projection.

When three-dimensional elements 34b are seen from a higher point of view, the vertices of the projections (i.e., three-dimensional raised elements 34b) in the intermediate area are eccentric. In a plan view of the surface of operation panel 33, the vertices of the projections (i.e., three-dimensional raised elements 34c) in the first input area and the vertices of the projections (i.e., three-dimensional raised elements 34a) in the non-input area are each located at the center. That is, three-dimensional raised elements 34b in the intermediate area are in a different shape from the projections of three-dimensional elements 34c in the first input area and three-dimensional elements 34a in the non-input area.

In this variation, assume that three-dimensional elements 34c in the first input area, three-dimensional elements 34b in the intermediate area, and three-dimensional elements 34a in the non-input area are cones. In this case, as a mere example, three-dimensional elements 34c in the first input area, three-dimensional elements 34b in the intermediate area, and three-dimensional elements 34a in the non-input area are cones with a diameter of 5 mm and a height of 2.5 mm at a pitch of 5 mm.

Figure 8B:
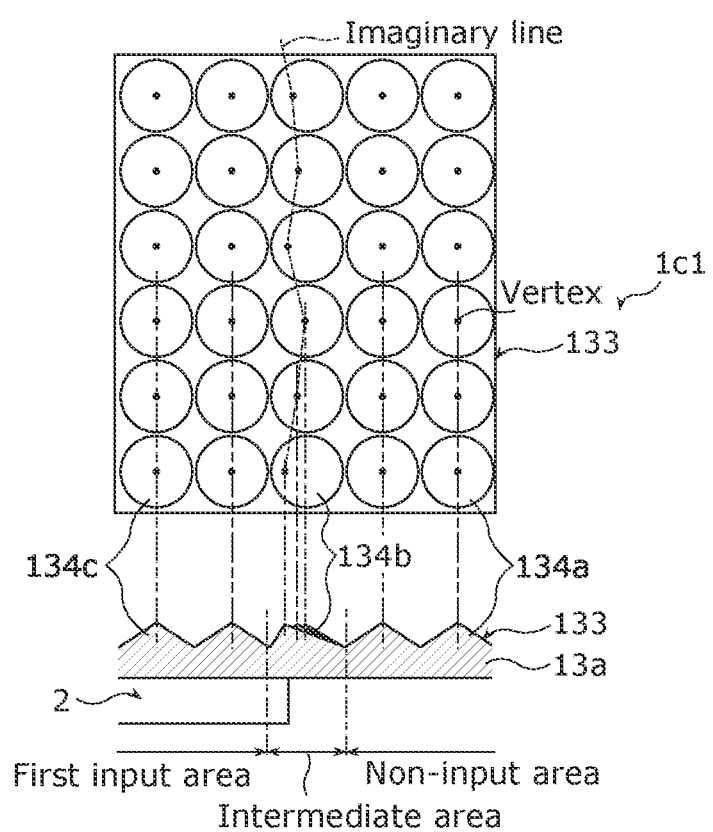
FIG. 8B includes a plan view and a cross-sectional view of another touch input device according to Variation 3.

As shown in FIG. 8B, the vertices of three-dimensional raised elements 134b in the intermediate area may be eccentric as follows. When three-dimensional elements 134b are seen from a higher point of view, the vertices of the projections (i.e., three-dimensional raised elements 134b) aligned in the intermediate area is connectable by one zigzag imaginary line, which is indicated by the dash-dot-dot line, along the alignment. That is, the vertices of three-dimensional raised elements 134b may be located in different positions. In this manner, three-dimensional elements 134b in different shapes are available. Three-dimensional elements 134b can be aligned with the vertices thereof located in different positions depending on the vertical positions in the plan view shown in FIG. 8B.

Note that at least some of the vertices of three-dimensional raised elements 34b and 134b in the intermediate area may be eccentric to the first input area and away from the non-input area.

Some of three-dimensional raised elements 34b and 134b may be in the same shape as three-dimensional raised elements 134c in the first input area and three-dimensional raised elements 134a in the non-input area.

Figure 9:
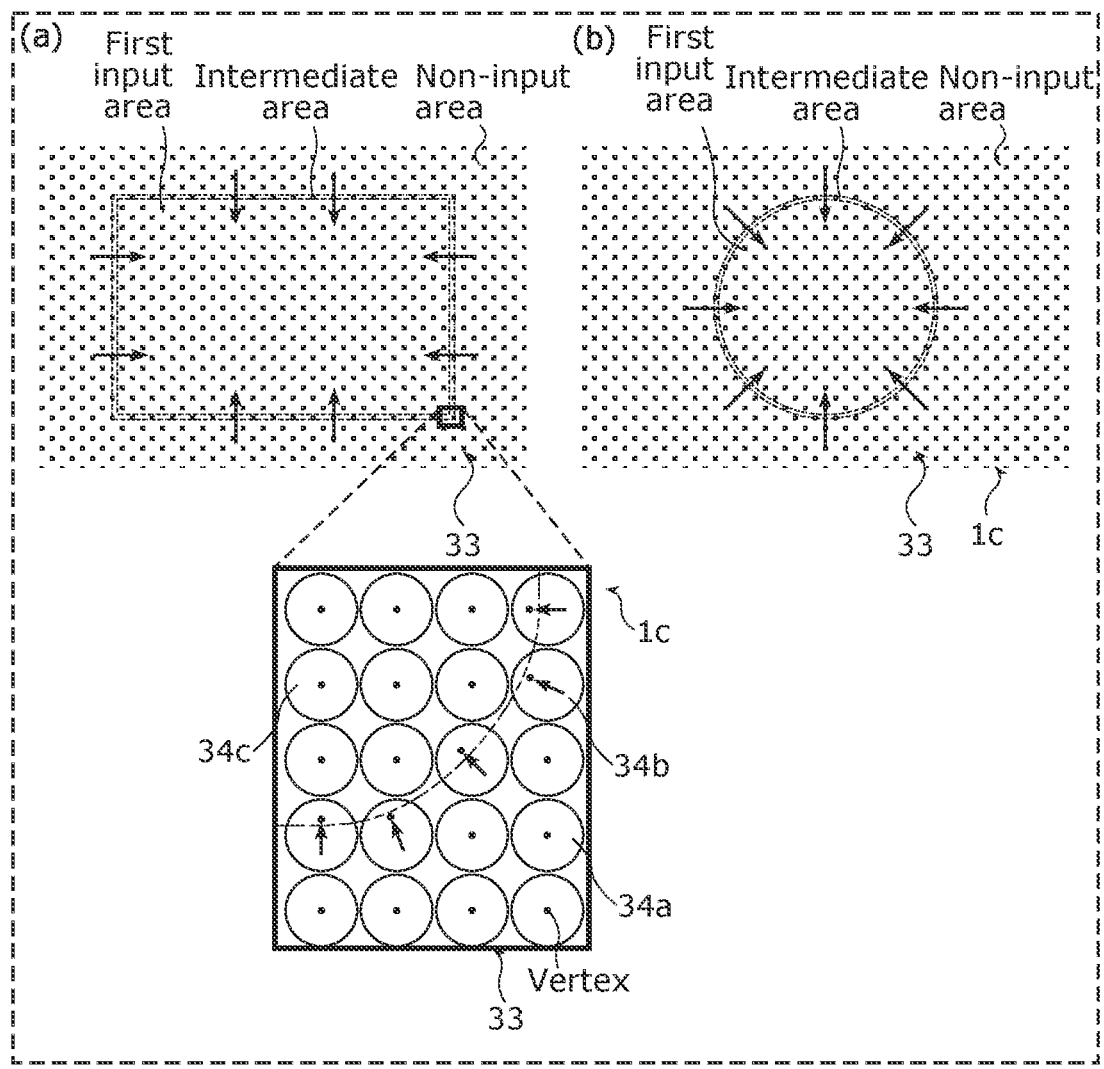
FIG. 9 includes a plan view and a partially enlarged view of the touch input device according to Variation 3.

As shown in (a) of FIG. 9, assume that the intermediate area is in the shape of a polygonal frame. The vertices of three-dimensional raised elements 34b in the intermediate area are at a corner closer to first input area, and eccentric along the normal of the inscribed circle, which is indicated by the dash-dot-dot line, of the boundary between input receiver 2 and the outside of input receiver 2. Specifically, along the normal of the inscribed circle, which is indicated by the dash-dot-dot line, of the boundary, the vertices may be eccentric from the center of each three-dimensional element 34b toward the first input area along the arrow by about ½ of the radius of the circle when three-dimensional element 34b is seen from a higher point of view. When deviating from the first input area toward the non-input area, the operating body in a trace operation on touch input device 1c at a corner is caught by any of the tips of three-dimensional elements 34b, which are eccentric, in the intermediate area. The user recognizes that moving the operating body is difficult in the direction, and easy in the opposite direction. That is, the user not only recognizes the difference in the sense of touch in the intermediate area but also recognize the correct trace direction of the operating body intuitively.

As shown in (b) of FIG. 9, if the intermediate area is a ring shape, all the circumferential points are oriented along the arrows. In (b) of FIG. 9, the partially enlarged view of touch input device 1c is omitted because it is the same as in (a) of FIG. 9.

In touch input devices 1c and 1c1 according to such a variation, three-dimensional elements 34b and 134b in the intermediate area, three-dimensional elements 34c and 134c in the first input area and three-dimensional elements 34a and 134a in the non-input area are conical projections. In a plan view of the surfaces of operation panel 33 and 133, the vertices of the projections (i.e., three-dimensional raised elements 34c and 134c) in the first input area and the vertices of the projections (i.e., three-dimensional raised elements 34a and 134a) in the non-input area are each located at the center. The vertices of the projections (i.e., three-dimensional raised elements 34b and 134b) in the intermediate area are eccentric.

When deviating from the first input area toward the non-input area, an operating body in a trace operation on touch input device 1c or 1c1 is caught by any of the tips of three-dimensional elements 34b, 134b (i.e., the vertices of the projections), which are eccentric, in the intermediate area. This allows the user to recognize the intermediate area on the boundary between input receiver 2 and the outside of input receiver 2.

In touch input device 1c1 (see FIG. 8B) according to such a variation, the vertices of the projections in the intermediate area are eccentric as follows. In a plan view of the surface of operation panel 33, the vertices of the projections (i.e., three-dimensional raised elements 134b) aligned in the intermediate area is connectable by one zigzag imaginary line along the alignment.

In this configuration, in the intermediate area, three-dimensional elements 134b can be aligned with the vertices thereof located in different positions. Assume that an operating body in a trace operation on touch input device 1c1 deviates from the first input area toward the non-input area. In this case, the user recognizes not only the gap but also a vertical and/or horizontal change (i.e., a change in the shape of three-dimensional elements 134b) with respect to the fingertip. As a result, the user recognizes the intermediate area more easily with a sense of touch.

[Variation 4]

First, this variation will be described with reference to FIGS. 10, 11A, and 11B.

Figure 10:
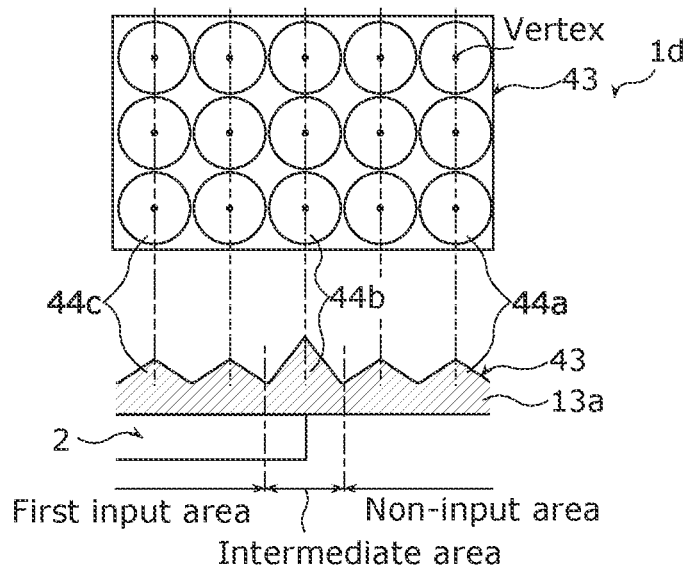
FIG. 10 includes a plan view and a cross-sectional view of a touch input device according to Variation 4.

FIG. 10 includes a plan view and a cross-sectional view of touch input device 1d according to Variation 4. FIG. 11A includes a plan view and a cross-sectional view of another touch input device 1d1 according to Variation 4. FIG. 11B includes a plan view and a cross-sectional view of further another touch input device 1d2 according to Variation 4.

In Embodiment 1, the three-dimensional raised elements in the first input area, the intermediate area, and the non-input area are each in a hemispherical or cylindrical shape, for example. On the other hand, as shown in FIG. 10, on operation panel 43 according to this variation, three-dimensional raised elements 44c, 44b, and 44a in the first input area, the intermediate area, and the non-input area, respectively, are each a conical projection.

Three-dimensional raised elements 44b in the intermediate area have a height greater than the height of three-dimensional elements 44c in the first input area and three-dimensional elements 44a in the non-input area. Specifically, there is the gap the gap of three-dimensional elements 44c in the first input area and three-dimensional elements 44a in the non-input area from three-dimensional elements 44b in the intermediate area. In one preferred embodiment, the gap has such a height that the operating body is less caught by in a trace operation and the gap is less conspicuous. For example, three-dimensional raised elements 44b in the intermediate area may have a height twice or less the height of three-dimensional raised elements 44c in the first input area and three-dimensional raised elements 44a in the non-input area in one preferred embodiment.

Figure 11A:
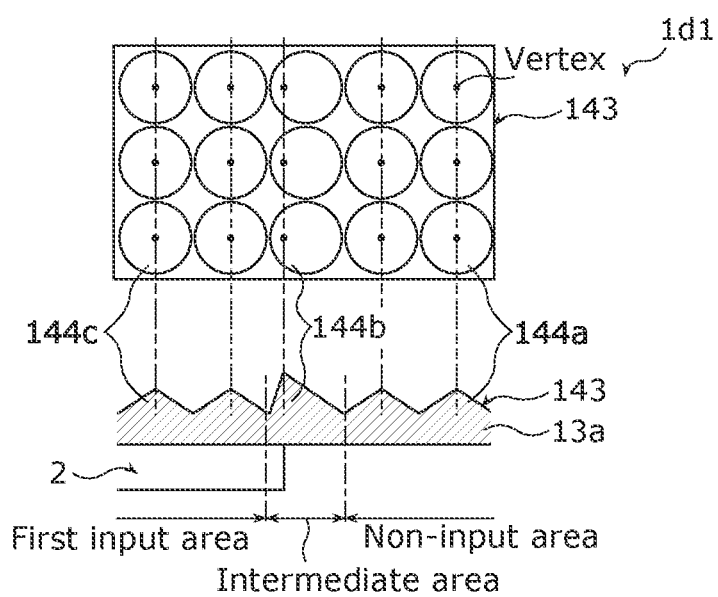
FIG. 11A includes a plan view and a cross-sectional view of another touch input device according to Variation 4.

As shown in FIG. 11A, the vertices of three-dimensional raised elements 144b in the intermediate area may be eccentric, when three-dimensional elements 144b are seen from a higher point of view. In this variation, the vertices of the projections (i.e., three-dimensional raised elements 144b) in the intermediate area are eccentric to the first input area and away from the non-input area. In a plan view of the surface of operation panel 143, the vertices of the projections (i.e., three-dimensional raised elements 144c) in the first input area and the vertices of the projections (i.e., three-dimensional raised elements 144a) in the non-input area are each located at the center. That is, three-dimensional raised elements 144b are in a shape different from the shape of three-dimensional raised elements 144c in the first input area and three-dimensional raised elements 144a in the non-input area.

Figure 11B:
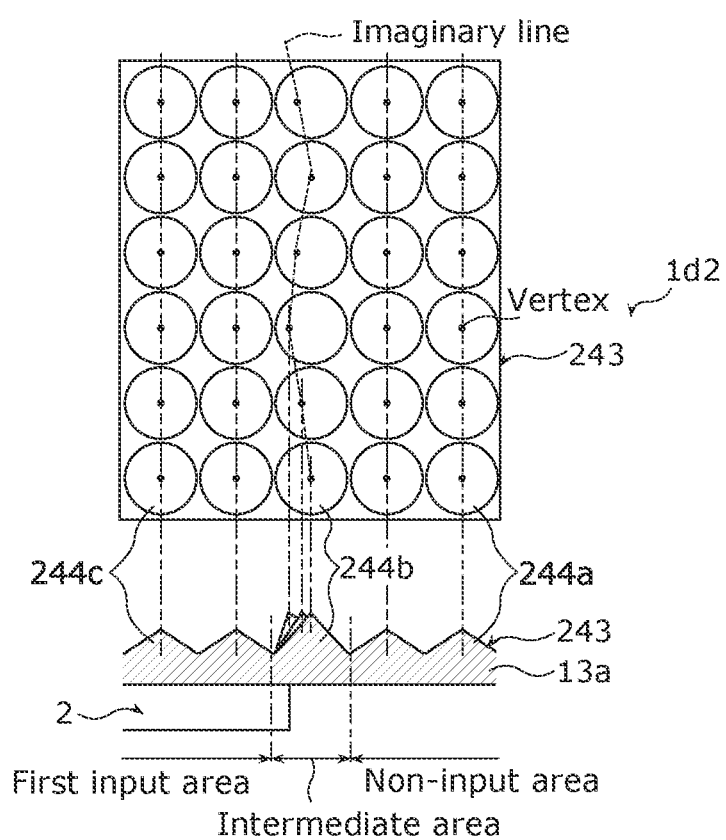
FIG. 11B includes a plan view and a cross-sectional view of further another touch input device according to Variation 4.

As shown in FIG. 11B, the vertices of three-dimensional raised elements 244b in the intermediate area may be eccentric as follows. When three-dimensional elements 244b are seen from a higher point of view, the vertices of projections (i.e., three-dimensional raised elements 244b) aligned in the intermediate area is connectable by one zigzag imaginary line, which is indicated by the dash-dot-dot line, along the alignment. That is, the vertices of three-dimensional raised elements 244b may be located in different positions. In this variation, at least some of the vertices of three-dimensional raised elements 244b in the intermediate area may be eccentric to the first input area and away from the non-input area. In this manner, three-dimensional elements 244b in different shapes are available. Three-dimensional elements 244b can thus be aligned with the vertices thereof located in different positions depending on the vertical positions in the plan view shown in FIG. 11B.

Some of three-dimensional raised elements 244b may be in the same shape as three-dimensional raised elements 244c in the first input area and three-dimensional raised elements 244a in the non-input area.

In this case, like the configuration in FIG. 10, on operation panel 143, three-dimensional raised elements 144b in the intermediate area have a height greater than the height of three-dimensional raised elements 144c in the first input area and three-dimensional raised elements 144a in the non-input area. Three-dimensional raised elements 144b in the intermediate area may have a height twice or less the height of three-dimensional raised elements 144c in the first input area and three-dimensional raised elements 144a in the non-input area in one preferred embodiment.

In touch input devices 1d, 1d1, and 1d2 (see FIGS. 10, 11A, and 11B) according to such a variation, three-dimensional elements 44b, 144b, and 244b in the intermediate area have a height greater than the height of three-dimensional elements 44c, 144c, and 244c in the first input area and three-dimensional elements 44a, 144a, and 244a in the non-input area.

Accordingly, in a trace operation, the user recognizes the following with a sense of touch through the operating body. Three-dimensional elements 44b, 144b, and 244b in the intermediate area are in a different shape from three-dimensional elements 44c, 144c, and 244c in the first input area and three-dimensional elements 44a, 144a, and 244a in the non-input area. That is, the provided slight gap allows the user to recognize the intermediate area on the boundary between input receiver 2 and the outside of input receiver 2.

In touch input device 1d1 (see FIG. 11A) according to such a variation, the vertices of the projections (i.e., three-dimensional raised elements 144b) in the intermediate area are eccentric to the first input area and away from the non-input area. In touch input device 1d2 (see FIG. 11B), the vertex of some of projections (i.e., three-dimensional raised elements 244b) in the intermediate area are eccentric to the first input area and away from the non-input area.

Accordingly, when deviating from the first input area toward the non-input area, the operating body in a trace operation on touch input device 1d1 or 1d2 is caught by any of the tips of three-dimensional elements 144b or 244b (i.e., the vertices of the projections), which are eccentric, in the intermediate area. This allows the user to recognize the intermediate area on the boundary between input receiver 2 and the outside of input receiver 2.

Touch input devices 1d1 and 1d2 causes the user in a trace operation using an operating body to recognize the following with a sense of touch through the operating body. Three-dimensional elements 144b and 244b in the intermediate area have a height greater than the height of three-dimensional elements 144c and 244c in the first input area and three-dimensional elements 144a and 244a in the non-input area. That is, the provided slight gap allows the user to recognize the intermediate area more easily, with a sense of touch.

In touch input device 1d2 (see FIG. 11B) according to such a variation, the vertices of the projections in the intermediate area are eccentric as follows. In a plan view of the surface of operation panel 243, the vertices of the projections (i.e., three-dimensional raised elements 244b) aligned in the intermediate area is connectable by one zigzag imaginary line along the alignment.

In this configuration, in the intermediate area, three-dimensional elements 244b can be aligned with the vertices thereof located in different positions. Assume that an operating body in a trace operation on touch input device 1d2 deviates from the first input area toward the non-input area. In this case, the user recognizes not only the gap but also a vertical and/or horizontal change (i.e., a change in the shape of three-dimensional elements 244b) with respect to the fingertip. As a result, the user recognizes the intermediate area more easily with a sense of touch.

[Variation 5]

First, this variation will be described with reference to FIGS. 12A, 12B, and 13.

Figure 12A:
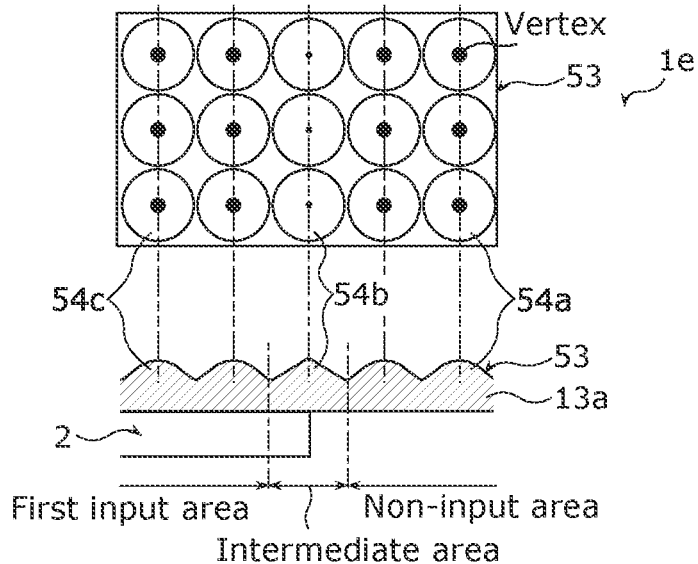
FIG. 12A includes a plan view and a cross-sectional view of a touch input device according to Variation 5.

FIG. 12A includes a plan view and a cross-sectional view of touch input device 1e according to Variation 5. FIG. 12B includes a plan view and a cross-sectional view of another touch input device 1e2 according to Variation 5. FIG. 13 includes a plan view and a cross-sectional view of further another touch input device 1e1 according to Variation 5.

In Embodiment 1, the three-dimensional raised elements in the first input area, the intermediate area, and the non-input area are each in a hemispherical or cylindrical shape, for example. On the other hand, as shown in FIG. 12A, on operation panel 53 according to this variation, three-dimensional raised elements 54c, 54b, and 54a in the first input area, the intermediate area, and the non-input area, respectively, are each a conical projection. In addition, in this variation, the distal ends of the projections (i.e., three-dimensional raised elements 54b) in the intermediate area have a curvature radius different from the curvature radius of the distal ends of the projections (i.e., three-dimensional raised elements 54c) in the first input area and the projections (i.e., three-dimensional raised elements 54a) in the non-input area. The distal ends of the projections in the intermediate area have a curvature radius smaller than the curvature radius of the distal ends of the projections in the first input area and in the non-input area. Note that the distal ends of the projections in the intermediate area may have a curvature radius greater than the curvature radius of the distal ends of the projections in the first input area and in the non-input area. In this case, the user has a sense of touch caught by none of the projections in the intermediate area.

Figure 12B:
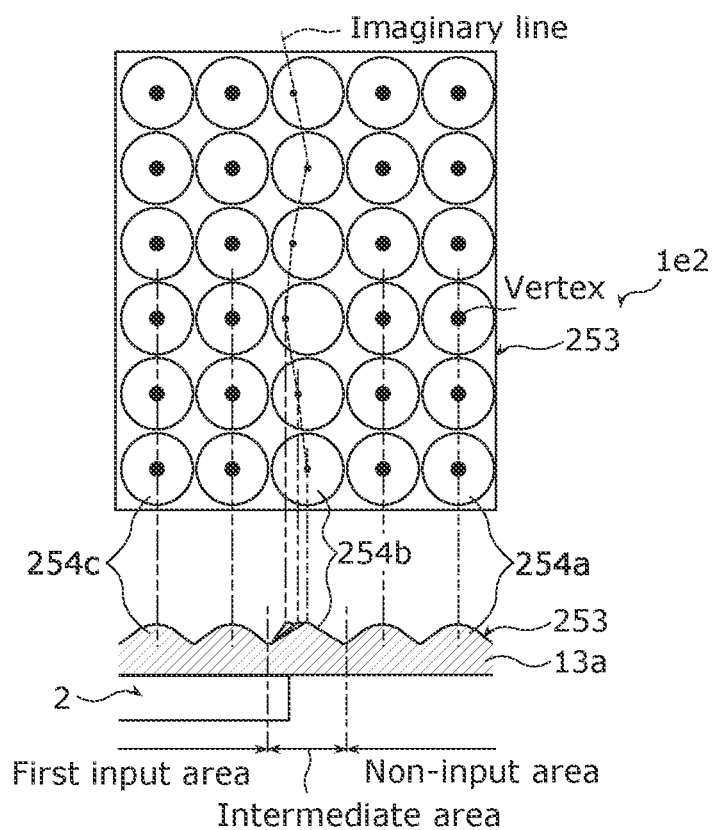
FIG. 12B includes a plan view and a cross-sectional view of another touch input device according to Variation 5.

As shown in FIG. 12B, the vertices of three-dimensional raised elements 254b in the intermediate area may be eccentric as follows. When three-dimensional elements 254b are seen from a higher point of view, the vertices of the projections (i.e., three-dimensional raised elements 254b) aligned in the intermediate area is connectable by one zigzag imaginary line, which is indicated by the dash-dot-dot line, along the alignment. That is, the vertices of three-dimensional raised elements 254b are located in different positions. In this manner, three-dimensional elements 254b in different shapes are available. Three-dimensional elements 254b can be aligned with the vertices thereof located in different positions depending on the vertical positions in the plan view shown in FIG. 12B.

Some of three-dimensional raised elements 254b may be in the same shape as three-dimensional raised elements 254c in the first input area and three-dimensional raised elements 254a in the non-input area.

Note that at least some of the vertices of three-dimensional raised elements 154b and 254b in the intermediate area may be eccentric to the first input area and away from the non-input area.

Figure 13:
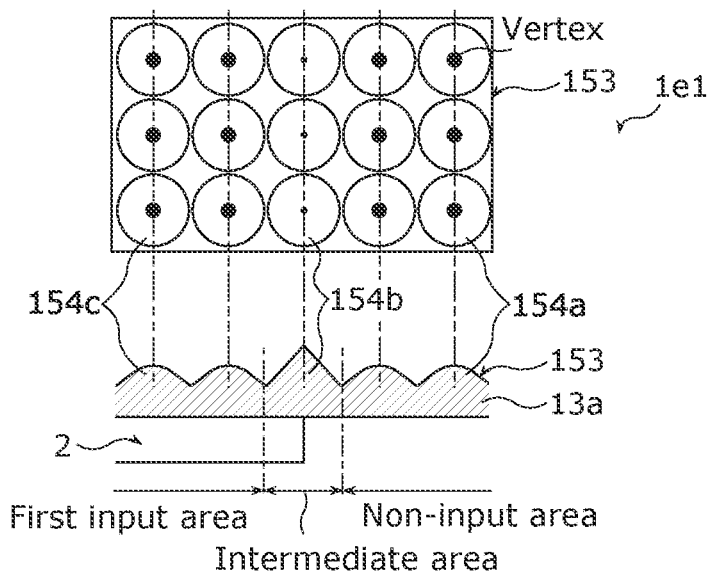
FIG. 13 includes a plan view and a cross-sectional view of further another touch input device according to Variation 5.

As shown in FIG. 13, on operation panel 153, three-dimensional raised elements 154b in the intermediate area have a height greater than the height of three-dimensional raised elements 154c in the first input area and three-dimensional raised elements 154a in the non-input area. Three-dimensional raised elements 154b in the intermediate area may have a height twice or less the height of three-dimensional raised elements 154c in the first input area and three-dimensional raised elements 154a in the non-input area in one preferred embodiment.

In touch input devices 1e, 1e1, and 1e2 according to such a variation, three-dimensional elements 54b, 154b, and 254b in the intermediate area, three-dimensional elements 54c, 154c, and 254c in the first input area and three-dimensional elements 54a, 154a, and 254a in the non-input area are conical projections. The projections (i.e., three-dimensional raised elements 54b, 154b, and 254b) in the intermediate area have each a distal end with a curvature radius smaller than the curvature radius of the distal ends of the projections (i.e., three-dimensional raised elements 54c, 154c, and 254c) in the first input area and the projections (i.e., three-dimensional raised elements 54a, 154a, and 254a) in the non-input area.

Accordingly, in the first input area, the operating body moves smoothly in a trace operation. In the intermediate area, the operating body in a trace operation is caught by any of the tips of three-dimensional elements 54b, 154b, and 254b (i.e., the vertices of the projections) in the intermediate area. This allows the user to recognize the intermediate area on the boundary between input receiver 2 and the outside of input receiver 2.

Touch input device 1e1 (see FIG. 13) causes the user in a trace operation using an operating body to recognize the following with a sense of touch through the operating body. Three-dimensional elements 154b in the intermediate area have a height greater than the height of three-dimensional elements 154c in the first input area and three-dimensional elements 154a in the non-input area. That is, the provided slight gap allows the user to recognize the intermediate area more easily with a sense of touch.

In touch input device 1e2 (see FIG. 12B) according to such a variation, the vertices of the projections in the intermediate area are eccentric as follows. In a plan view of the surface of operation panel 253, the vertices of the projections (i.e., three-dimensional raised elements 254b) aligned in the intermediate area is connectable by one zigzag imaginary line along the alignment.

In this configuration, in the intermediate area, three-dimensional elements 254b can be aligned with the vertices thereof located in different positions. Assume that an operating body in a trace operation on touch input device 1e2 deviates from the first input area toward the non-input area. In this case, the user recognizes not only the gap but also a vertical and/or horizontal change (i.e., a change in the shape of three-dimensional elements 254b) with respect to the fingertip. As a result, the user recognizes the intermediate area more easily with a sense of touch.

[Variation 6]

First, this variation will be described with reference to FIGS. 14A and 14B.

Figure 14A:
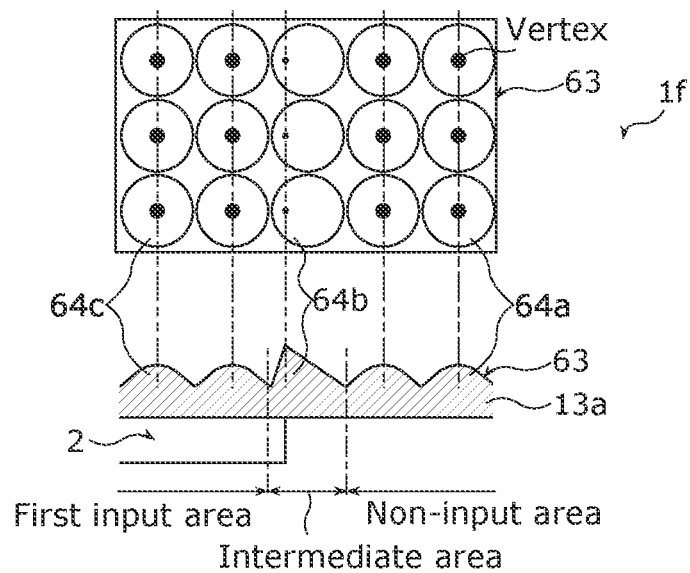
FIG. 14A includes a plan view and a cross-sectional view of a touch input device according to Variation 6.

FIG. 14A includes a plan view and a cross-sectional view of touch input device 1f according to Variation 6. FIG. 14B includes a plan view and a cross-sectional view of another touch input device 1f1 according to Variation 6.

In this variation, the vertices of the projections in the intermediate area are more eccentric than in Variation 5. In a plan view of the surface of operation panel 63, the vertices of the projections in the first input area and in the non-input area are each located at the center.

As shown in FIG. 14A, the projections in the intermediate area have each a distal end with a curvature radius smaller than the curvature radius of the distal ends of the projections in the first input area and in the non-input area. Note that the distal ends of the projections in the intermediate area may have a curvature radius greater than the curvature radius of the distal ends of the projections in the first input area and in the non-input area. In this case, the user has a sense of touch caught by none of the projections in the intermediate area.

Figure 14B:
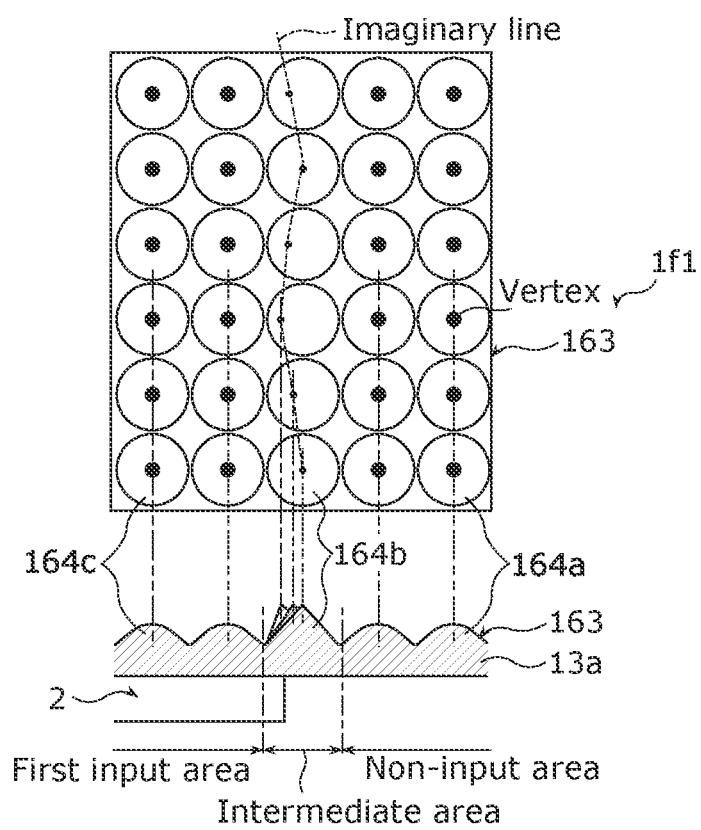
FIG. 14B includes a plan view and a cross-sectional view of another touch input device according to Variation 6.

As shown in FIG. 14B, the vertices of three-dimensional raised elements 164b in the intermediate area may be eccentric as follows. When three-dimensional elements 164b are seen from a higher point of view, the vertices of the projections (i.e., three-dimensional raised elements 164b) aligned in the intermediate area is connectable by one zigzag imaginary line, which is indicated by the dash-dot-dot line, along the alignment. That is, the vertices of three-dimensional raised elements 164b may be located in different positions. In this manner, three-dimensional elements 164b in different shapes are available. Three-dimensional elements 164b can thus be aligned with the vertices thereof located in different positions depending on the vertical positions in the plan view shown in FIG. 14B.

Note that at least some of the vertices of three-dimensional raised elements 64b and 164b in the intermediate area may be eccentric to the first input area and away from the non-input area.

Some of three-dimensional raised elements 164b may be in the same shape as three-dimensional raised elements 164c in the first input area and three-dimensional raised elements 164a in the non-input area.

In this embodiment, the distal ends of the projections in the intermediate area have each a curve with a curvature radius of 0.1 mm, while the distal ends of the projections in the first input area and in the non-input area have each a curve with a curvature radius of 0.5 mm.

In touch input devices 1f and 1f1 according to such a variation, in a plan view of the surfaces of operation panels 63 and 163, the vertices of the projections (i.e., three-dimensional raised elements 64c and 164c) in the first input area and the projections (i.e., three-dimensional raised elements 64a and 164a) in the non-input area are each located at the center. On the other hand, the vertices of the projections (i.e., three-dimensional raised elements 64b and 164b) in the intermediate area are eccentric.

Accordingly, in the first input area, the operating body moves smoothly in a trace operation. In the intermediate area, the operating body in a trace operation is caught by any of the tips of the three-dimensional elements 64b and 164b (i.e., the vertices of the projections) in the intermediate area.

This allows the user to recognize the intermediate area on the boundary between input receiver 2 and the outside of input receiver 2.

The user in a trace operation using an operating body recognizes the following with a sense of touch through the operating body. Three-dimensional elements 64b and 164b in the intermediate area have a height greater than the height of three-dimensional elements 64c and 164c in the first input area and three-dimensional elements 64a and 164a in the non-input area. That is, the provided slight gap allows the user to recognize the intermediate area more easily with a sense of touch.

In touch input device 1/1 (see FIG. 14B) according to such a variation, the vertices of the projections in the intermediate area are eccentric as follows. In a plan view of the surface of operation panel 163, the vertices of the projections (i.e., three-dimensional raised elements 164b) aligned in the intermediate area is connectable by one zigzag imaginary line along the alignment.

In this configuration, in the intermediate area, three-dimensional elements 164b can be aligned with the vertices thereof located in different positions. Assume that an operating body in a trace operation on touch input device 1/1 deviates from the first input area toward the non-input area. In this case, the user recognizes not only the gap but also a vertical and/or horizontal change (i.e., a change in the shape of three-dimensional elements 164b) with respect to the fingertip. As a result, the user recognizes the intermediate area more easily with a sense of touch.

[Variation 7]

First, this variation will be described with reference to FIGS. 15 and 16.

Figure 15:
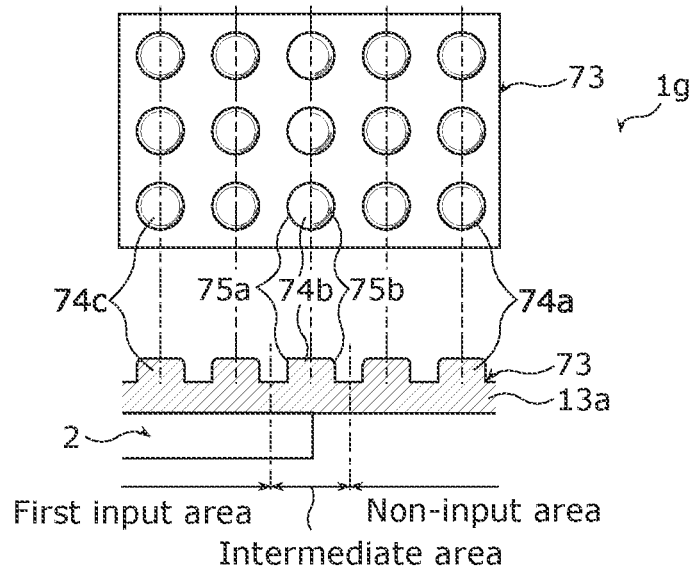
FIG. 15 includes a plan view and a cross-sectional view of a touch input device according to Variation 7.

FIG. 15 includes a plan view and a cross-sectional view of touch input device 1g according to Variation 7. FIG. 16 includes a plan view and a cross-sectional view of another touch input device 1g1 according to Variation 7.

In this variation, as shown in FIG. 15, on operation panel 73, three-dimensional elements 74b in the intermediate area are each in different shapes at the ends closer to the first input area and to the non-input area.

In this variation, three-dimensional elements 74b in the intermediate area, three-dimensional elements 74c in the first input area, and three-dimensional elements 74a in the non-input area are columnar projections. FIG. 15 illustrates cylindrical projections.

In this variation, the distal ends of the projections (i.e., three-dimensional raised elements 74b) in the intermediate area have each first edge 75a closer to the first input area, and second edge 75b closer to the non-input area. First edge 75a faces the first input area, while second edge 75b faces the non-input area. In this case, first edge 75a has a curvature radius smaller than the curvature radius of the edges of the projections in the first input area and in the non-input area. First edge 75a has a curvature radius smaller than the curvature radius of second edge 75b. Accordingly, first edge 75a is sharper than second edge 75b. Second edge 75b may have the same curvature radius as the curvature radius of the edges of the projections in the first input area and in the non-input area.

Note that first edge 75a may have the same curvature radius as the curvature radius of second edge 75b. In this case, the curvature radius of first edge 75a and second edge 75b is smaller than the curvature radius of the edges of the projections in the first input area and in the non-input area. Accordingly, both first edge 75a and second edge 75b may be sharp. Assume that the operating body crosses over the intermediate area and enters the non-input area in a trace operation. In this case, when the operating body returns to the first input area while performing the trace operation, the user recognizes that the operation body has entered the first input area, with a sense of touch.

In this embodiment, three-dimensional elements 74c in the first input area, three-dimensional elements 74b in the intermediate area, and three-dimensional elements 74a in the non-input area are cylinders with a diameter of 2.5 mm and a height of 1 mm at a pitch of 5 mm. In this embodiment, first edge 75a has a curve with a curvature radius of 0.1 mm in the intermediate area, while the distal ends of the projections in the first input area and in the non-input area have each a curve with a curvature radius of 0.5 mm.

Figure 16:
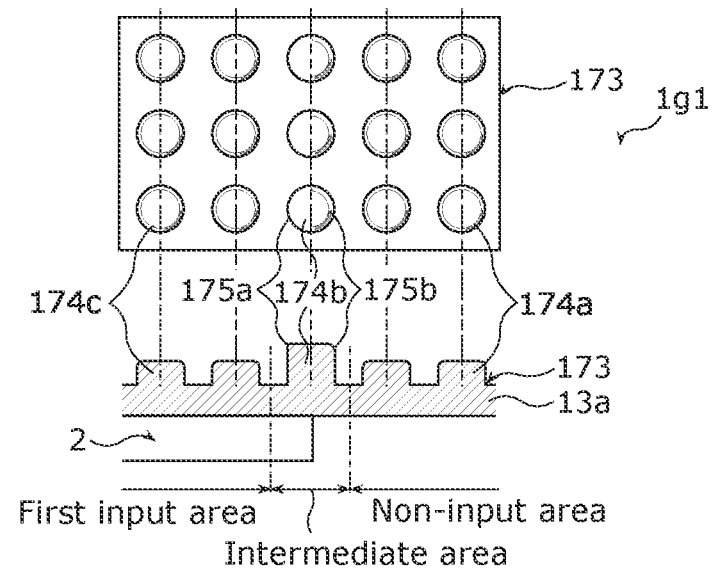
FIG. 16 includes a plan view and a cross-sectional view of another touch input device according to Variation 7.

As shown in FIG. 16, on operation panel 173, three-dimensional raised elements 174b in the intermediate area have a height greater than the height of three-dimensional raised elements 174c in the first input area and three-dimensional raised elements 174a in the non-input area. Three-dimensional raised elements 174b in the intermediate area may have a height twice or less the height of three-dimensional raised elements 174c in the first input area and three-dimensional raised elements 174a in the non-input area in one preferred embodiment.

In touch input devices 1g and 1g1 according to such a variation, three-dimensional elements 74b in the intermediate area, three-dimensional elements 74c in the first input area, and three-dimensional elements 74a in the non-input area are columnar projections. The edges (i.e., first edges 75a) of the distal ends of the projections (i.e., three-dimensional raised elements 174b) in the intermediate area closer to the first input area have a curvature radius smaller than the curvature radius of the edges of the distal ends of the projections in the first input area and in the non-input area.

Accordingly, in a trace operation using the operating body, the operating body is caught by any of first edges 75a of three-dimensional elements 74b in the intermediate area. This allows the user to recognize the intermediate area on the boundary between input receiver 2 and the outside of input receiver 2.

In a trace operation using an operating body, the user can recognize the following with a sense of touch through the operating body. Three-dimensional elements 174b in the intermediate area have a height greater than the height of three-dimensional elements 174c in the first input area and three-dimensional elements 174a in the non-input area. That is, the provided slight gap allows the user to recognize the intermediate area, with a sense of touch.

[Variation 8]

First, this variation will be described with reference to FIGS. 17 and 18.

Figure 17:
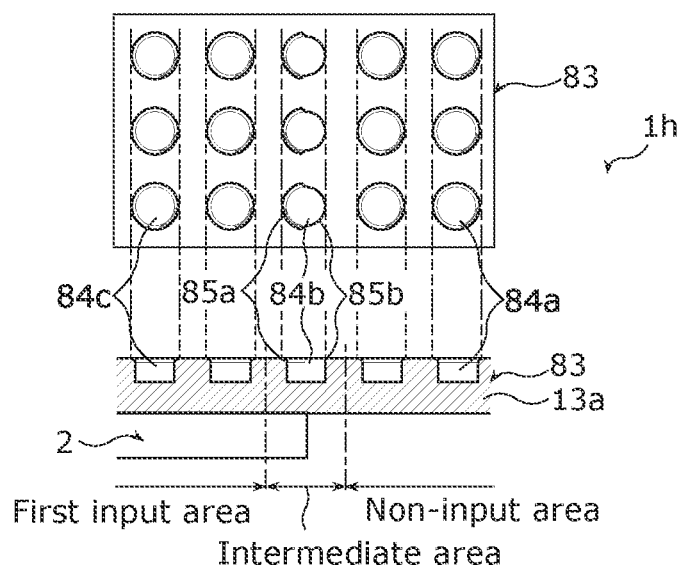
FIG. 17 includes a plan view and a cross-sectional view of a touch input device according to Variation 8.

FIG. 17 includes a plan view and a cross-sectional view of touch input device 1h according to Variation 8. FIG. 18 includes a plan view and a cross-sectional view of another touch input device 1h1 according to Variation 8.

In this variation, as shown in FIG. 17, on operation panel 83, three-dimensional elements 84b in the intermediate area are each in different shapes at the ends closer to the first input area and to the non-input area.

In this variation, the openings of the recesses, which are three-dimensional elements 84b in the intermediate area, have each first edge 85a closer to the first input area and second edge 85b closer to the non-input area. That is, first edge 85a faces the first input area, while second edge 85b faces the non-input area. In this case, second edge 85b of the opening of each recess (i.e., each three-dimensional recessed element 84b) in the intermediate area has a curvature radius smaller than the curvature radius of the edges of the openings of the recesses in the first input area and in the non-input area. Second edge 85b has a curvature radius smaller than the curvature radius of first edge 85a. Accordingly, second edge 85b is sharper than first edge 85a. Alternatively, first edge 85a may have the same curvature radius as the curvature radius of the openings of the recesses (i.e., three-dimensional recessed elements 84c and 84a) in the first input area and in the non-input area.

Note that first edge 85a may have the same curvature radius as the curvature radius of second edge 85b. In this case, the curvature radius of first edge 85a and second edge 85b is smaller than the curvature radius of the edges of the openings of the recesses in the first input area and in the non-input area. Accordingly, both first edge 85a and second edge 85b may be sharp. Assume that the operating body crosses over the intermediate area and enters the non-input area in a trace operation. In this case, when the operating body returns to the first input area while performing the trace operation, the user recognizes that the operation body has entered the first input area, with a sense of touch.

In this variation, each second edge 85b in intermediate area is located outside the boundary between input receiver 2 and the outside of input receiver 2, in contact with the boundary. That is, when operation panel 83 and input receiver 2 are viewed in an overlapping manner, second edge 85b in the intermediate area extends along the boundary between input receiver 2 and the outside of input receiver 2.

In this embodiment, three-dimensional elements 84c in the first input area, three-dimensional elements 84b in the intermediate area, and three-dimensional elements 84a in the non-input area are holes with a diameter of 2.5 mm and a depth of 1 mm at a pitch of 5 mm. In this embodiment, second edge 85b in the intermediate area has a curve with a curvature radius of 0.1 mm, while the openings of the recesses in the first input area and in the non-input area have each a curve with a curvature radius of 0.5 mm.

Figure 18:
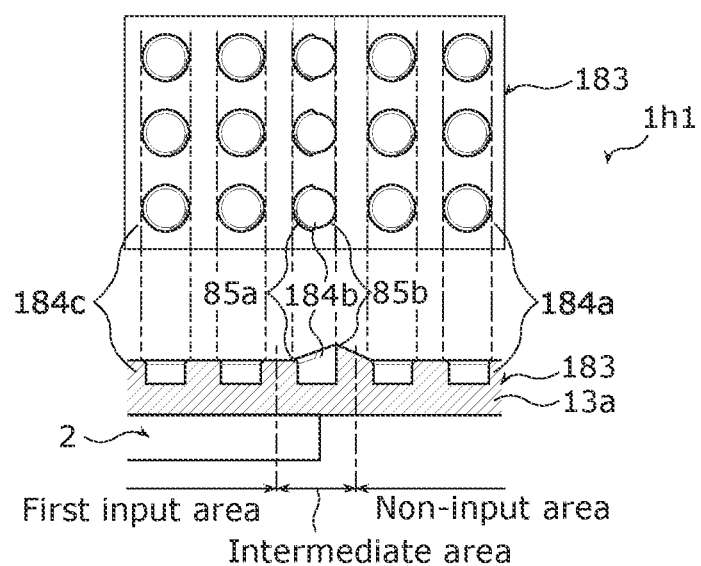
FIG. 18 includes a plan view and a cross-sectional view of another touch input device according to Variation 8.

As shown in FIG. 18, on operation panel 183, three-dimensional raised elements 184b in the intermediate area have a height greater than the height of three-dimensional raised elements 184c in the first input area and three-dimensional raised elements 184a in the non-input area. The three-dimensional raised elements in the intermediate area may have a height twice or less the height of three-dimensional raised elements 184c in the first input area and three-dimensional raised elements 184a in the non-input area in one preferred embodiment.

In touch input devices 1h and 1h1 according to such a variation, three-dimensional elements 84b in the intermediate area, three-dimensional elements 84c in the first input area, and three-dimensional elements 84a in the non-input area are recesses. The openings of the recesses, which are three-dimensional elements 84b (three-dimensional recessed elements 84b) in the intermediate area have each an edge (second edge 85b) closer to the non-input area. The edge (second edge 85b) has a curvature radius smaller than the curvature radius of the edges of the openings of the recesses (i.e., three-dimensional recessed elements 84c) in the first input area and recesses (i.e., three-dimensional recessed elements 84a) in the non-input area.

Accordingly, in a trace operation using the operating body, the operating body is caught by any of second edges 85b of three-dimensional elements 84b in the intermediate area. This allows the user to recognize the intermediate area on the boundary between input receiver 2 and the outside of input receiver 2.

The user in a trace operation using an operating body recognizes the following with a sense of touch through the operating body. Three-dimensional elements 184b in the intermediate area have a height greater than the height of three-dimensional elements 184c in the first input area and three-dimensional elements 184a in the non-input area. That is, the provided slight gap allows the user to recognize the intermediate area more easily with a sense of touch.

[Variation 9]

First, this variation will be described with reference to FIGS. 19A to 19D.

Figure 19A:
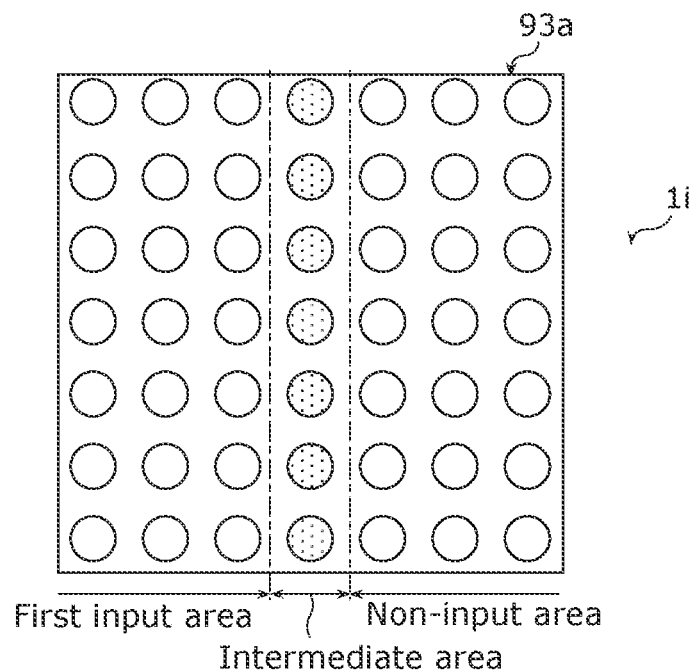
FIG. 19A is a plan view of a touch input device according to Variation 9.
Figure 19B:
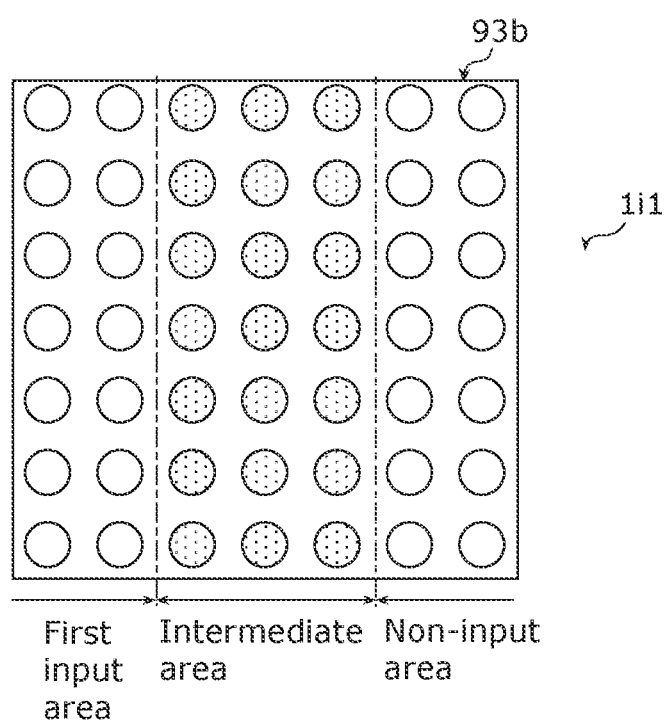
FIG. 19B is a plan view of another touch input device according to Variation 9.
Figure 19C:
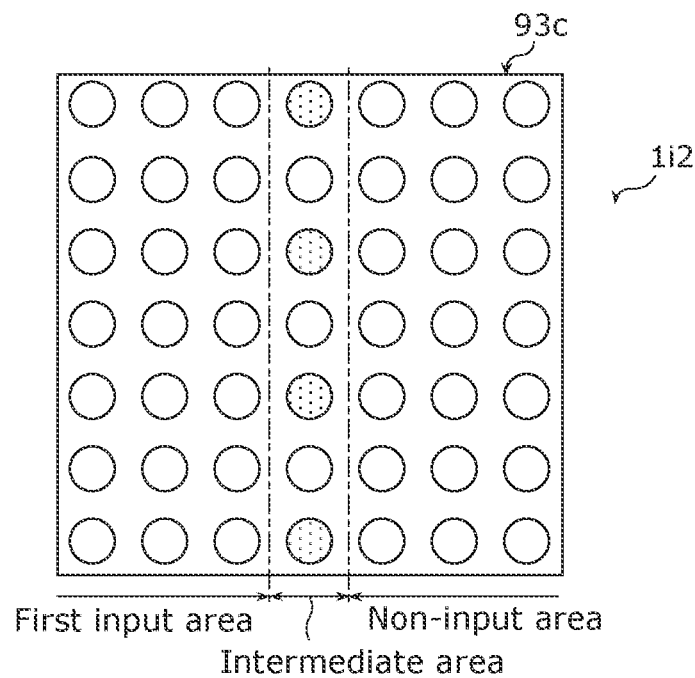
FIG. 19C is a plan view of further another touch input device according to Variation 9.
Figure 19D:
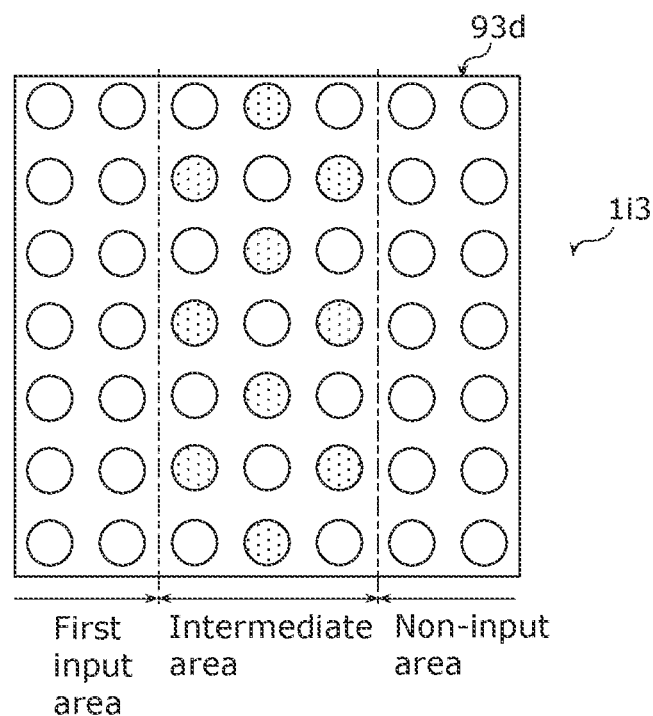
FIG. 19D is a plan view of still another touch input device according to Variation 9.

FIG. 19A is a plan view of touch input device 1i according to Variation 9. FIG. 19B is a plan view of another touch input device 1i1 according to Variation 9. FIG. 19C is a plan view of further another touch input device 1i2 according to Variation 9. FIG. 19D is a plan view of still another touch input device 1i3 according to Variation 9.

In this variation, as shown in FIGS. 19A to 19D, three-dimensional elements 94b in the intermediate area may be arranged continuously or at a certain interval.

For example, as dotted in FIG. 19A, on operation panel 93a, three-dimensional elements 94b in the intermediate area may be aligned continuously in a line.

As dotted in FIG. 19B, on operation panel 93b, three-dimensional elements 94b in the intermediate area may be aligned continuously in lines.

As dotted in FIG. 19C, on operation panel 93c, three-dimensional elements 94b in the intermediate area may be aligned discretely at a predetermined interval in a line.

As dotted in FIG. 19D, on operation panel 93d, three-dimensional elements 94b in the intermediate area may be aligned discretely at a predetermined interval in lines.

In touch input devices 1i, 1i1, 1i2, and 1i3 according to such variations, three-dimensional elements 94b in the intermediate area, three-dimensional elements 94c in the first input area and three-dimensional elements 94a in the non-input area are projections or recesses. In addition, three-dimensional elements 94c in the first input area, and three-dimensional elements 94a in the non-input area are arranged continuously. On the other hand, three-dimensional elements 94b in the intermediate area are arranged continuously or at a certain interval.

In these configurations, the locations of three-dimensional elements 94b in the intermediate area are combined as appropriate and adjusted to increase or decrease the difference in the sense of touch of the user in the intermediate area.

The appearances of slightly different three-dimensional elements 94b in the intermediate area can be adjusted to be less conspicuous.

[Other Variations]

While the touch input device and the method of manufacturing the operation panel according to the embodiment have been described above based on the embodiment and variations, the present disclosure is not limited to the embodiment and variations. The present disclosure may include forms obtained by various modifications to the foregoing embodiment and variations that can be conceived by those skilled in the art without departing from the scope and spirit of the present disclosure.

For example, in the touch input device and the method of manufacturing the operation panel according to the embodiment, the three-dimensional elements in the first input area and in the non-input area may be in the same shape. The three-dimensional elements in the first input area, in the second input area, and in the non-input area may be in the same shape. All the three-dimensional elements inside the first input area may be in the same shape. All the three-dimensional elements inside the second input area may be in the same shape.

In the touch input device and the method of manufacturing the operation panel according to the embodiment, all the three-dimensional elements inside the non-input area may be in the same shape as all the three-dimensional elements inside the intermediate area. Assume that an operating body in a trace operation on the touch input device deviates from the first input area toward the non-input area. In this case, the user recognizes the difference in the sense of touch. By causing the user to recognize the difference in the sense of touch, the touch input device allows the user to bring the operating body back to the first input area.

In the touch input device and the method of manufacturing the operation panel according to the embodiment, the operation panel may be light-transmissive. Specifically, on the operation panel, at least one of the first input area, the non-input area, or the intermediate area may be light-transmissive. This allows for display of a design on the operation panel, for example. The operation panel may emit light to allow a user to visually identify each of the first input area, the non-input area, and the intermediate area. For example, a light source or an image display device is placed on the back surface, which is opposite to the front surface, of the operation panel. The light source or the image display device may emit light so that at least one of the first input area, the non-input area, or the intermediate area is light-transmissive.

As the touch input device and the method of manufacturing the operation panel according to the embodiment, a touch pad with a touch sensor is illustrated. This may be replaced with, for example, a touch button, such as an icon key or an up, down, right, or left key, on an input receiver of the panel for an ON/OFF operation of the power supply, illumination, or any other suitable element. In this case as well, the embodiment allows the user to recognize the position of a touch button with a sense of touch.

In the touch input device and the method of manufacturing the operation panel according to the embodiment, FIG. 12A to FIG. 14B show that the distal ends of the projections in the intermediate area have a curvature radius smaller than the curvature radius of the distal ends of the projections in the first input area and in the non-input. It may be opposite. That is, the distal ends of the projections in the intermediate area may have a curvature radius greater than the curvature radius of the distal ends of the projections in the first input area and in the non-input area. In this case, the user has a sense of touch caught by none of the projections in the intermediate area.

In the touch input device and the method of manufacturing the operation panel according to the embodiment, assume that the projections are formed in lines in the intermediate area. In this case, the vertices of the projections in each line in the intermediate area may be eccentric to be connectable by one zigzag imaginary line along an alignment of the projections.

Note that the present disclosure may include forms obtained by various modifications to the embodiment that can be conceived by those skilled in the art or forms achieved by freely combining the elements and functions in the foregoing embodiment without departing from the scope and spirit of the present disclosure. Specifically, the present disclosure may include embodiments achieved by freely combining the elements and functions in the embodiment, Variations 1 to 9, and other variations.

[Additional Notes]

Now, the features of the touch input device and the method of manufacturing the operation panel will be described, which have been described above based on the embodiment and variations.

[Technique 1]

A touch input device comprising:

an operation panel including a first input area, a non-input area around the first input area, and an intermediate area between the first input area and the non-input area so as to surround the first input area, the first input area accepting an input operation, the non-input area accepting no input operation; and an input receiver that accepts at least an input to the first input area, wherein the operation panel includes three-dimensional elements on a surface the operation panel in each of the first input area, the non-input area, and the intermediate area, the three-dimensional elements being fine and raised or recessed, and the three-dimensional elements in at least one of the intermediate area, the first input area, or the non-input area are in a shape different from a shape of the three-dimensional elements in other areas of the intermediate area, the first input area, and the non-input area.

[Technique 2]

The touch input device according to Feature 1, wherein the intermediate area accepts an input operation.

[Technique 3]

The touch input device according to Feature 2, further comprising:

a second input area that accepts an input operation and is interposed between the intermediate area and the non-input area.

[Technique 4]

The touch input device according to any one of Features 1 to 3, wherein the three-dimensional elements in the intermediate area are different from the three-dimensional elements in the first input area and the three-dimensional elements in the non-input area.

[Technique 5]

The touch input device according to any one of Features 1 to 4, wherein the three-dimensional elements in the intermediate area, in the first input area, and in the non-input area are circular grooves, polygonal grooves, circular walls, or polygonal walls in a plan view of the operation panel.

[Technique 6]

The touch input device according to any one of Features 1 to 5, wherein a height of each of the three-dimensional elements in the intermediate area is greater than a height of each of the three-dimensional elements in the first input area and a height of each of the three-dimensional elements in the non-input area.

[Technique 7]

The touch input device according to any one of Features 1 to 6, wherein the three-dimensional elements in the intermediate area, in the first input area, and in the non-input area are each a conical projection, and in a plan view of the surface of the operation panel, vertices of the projections in the first input area and in the non-input area are each at a center, and vertices of the projections in the intermediate area are eccentric.

[Technique 8]

The touch input device according to Feature 7, wherein the vertices of the projections in the intermediate area are eccentric to the first input area and away from the non-input area.

[Technique 9]

The touch input device according to Feature 8, wherein the vertices of the projections in the intermediate area are eccentric to be connectable by one zigzag imaginary line along an alignment of the projections in a plan view of the surface of the operation panel.

[Technique 10]

The touch input device according to any one of Features 1 to 9, wherein the three-dimensional elements in the intermediate area, in the first input area, and in the non-input area are each a conical projection, and distal ends of the projections in the intermediate area have a curvature radius smaller than a curvature radius of distal ends of the projections in the first input area and in the non-input area.

[Technique 11]

The touch input device according to Feature 10, wherein in a plan view of the surface of the operation panel, vertices of the projections in the first input area and in the non-input area are each at a center, and vertices of the projections in the intermediate area are eccentric.

[Technique 12]

The touch input device according to Feature 11, wherein the vertices of the projections in the intermediate area are eccentric to be connectable by one zigzag imaginary line along an alignment of the projections in a plan view of the surface of the operation panel.

[Technique 13]

The touch input device according to any one of Features 1 to 12, wherein the three-dimensional elements in the intermediate area, in the first input area, and in the non-input area are projections that are columnar, and edges of distal ends of the projections in the intermediate area closer to the first input area have a curvature radius smaller than a curvature radius of edges of distal ends of the projections in the first input area and the non-input area.

[Technique 14]

The touch input device according to any one of Features 1 to 12, wherein the three-dimensional elements in the intermediate area, in the first input area, and in the non-input area are recesses, and opening edges of the recesses in the intermediate area closer to the non-input area have a curvature radius smaller than a curvature radius of opening edges of the recesses in the first input area and in the non-input area.

[Technique 15]

The touch input device according to any one of Features 1 to 14, wherein the three-dimensional elements in the first input area and in the non-input area are arranged continuously, and the three-dimensional elements in the intermediate area are arranged continuously or at a certain interval.

[Technique 16]

The touch input device according to any one of Features 1 to 15, wherein at least one of the first input area, the non-input area, or the intermediate area is light-transmissive.

[Technique 17]

The touch input device according to any one of Features 1 to 16, wherein the surface of the operation panel is matte.

[Technique 18]

A method of manufacturing an operation panel of a touch input device, the method including:

forming, on a surface of the operation panel, a first input area, a non-input area around the first input area, and an intermediate area between the first input area and the non-input area so as to surround the first input area, the first input area accepting an input operation, the non-input area accepting no input operation; and forming three-dimensional elements that are fine and raised or recessed, in each of the first input area, the non-input area, and the intermediate area, wherein the three-dimensional elements in at least one of the intermediate area, the first input area, or the non-input area are in a different shape, and the three-dimensional elements in the intermediate area, in the first input area, and in the non-input area are transferred onto the surface of the operation panel, using a mold.

[Technique 19]

The method according to Feature 18, wherein the three-dimensional elements in the intermediate area, in the first input area, and in the non-input area are transferred onto the surface of the operation panel by injection molding using a mold.

[Technique 20]

A method of manufacturing an operation panel of a touch input device, the method including:

forming, on a surface of the operation panel, a first input area, a non-input area around the first input area, and an intermediate area between the first input area and the non-input area so as to surround the first input area, the first input area accepting an input operation, the non-input area accepting no input operation; and forming three-dimensional elements that are fine and raised or recessed, in each of the first input area, the non-input area, and the intermediate area, wherein the three-dimensional elements in at least one of the intermediate area, the first input area, or the non-input area are in a different shape, and the three-dimensional elements in the intermediate area, in the first input area, and in the non-input area are formed on the surface of the operation panel by printing on a film or the surface of the operation panel.

Further Information about Technical Background to this Application

The disclosures of the following patent applications including specification, drawings, and claims are incorporated herein by reference in their entirety: Japanese Patent Application No. 2023-013590 filed on Jan. 31, 2023, and Japanese Patent Application No. 2023-144448 filed on Sep. 6, 2023.

INDUSTRIAL APPLICABILITY

A touch input device and a method of manufacturing an operation panel according to the present disclosure are applicable to an operation input device, for example, for a display device on a moving body, such as a vehicle or an aircraft, in a facility, or in any other suitable place.

The invention claimed is:

1. A touch input device comprising:
an operation panel including a first input area that accepts an input operation, a non-input area that accepts no input operation, and an intermediate area, the non-input area surrounding the first input area, the intermediate area being interposed between the first input area and the non-input area so as to surround the first input area; and
an input receiver that accepts at least an input to the first input area, wherein
the operation panel includes a plurality of regularly or randomly arranged projections on a surface of the operation panel in each of the first input area, the non-input area, and the intermediate area,
the plurality of projections in at least one of the intermediate area, the first input area, or the non-input area are in a shape different from a shape of the plurality of projections in other areas of the intermediate area, the first input area, and the non-input area,
the intermediate area accepts an input operation, and
the touch input device further comprises a second input area that accepts an input operation and is interposed between the intermediate area and the non-input area.

2. The touch input device according to claim 1, wherein the plurality of projections in the intermediate area are different from the plurality of projections in the first input area and the plurality of projections in the non-input area.

3. The touch input device according to claim 1, wherein a height of each of the plurality of projections in the intermediate area is greater than a height of each of the plurality of projections in the first input area and a height of each of the plurality of projections in the non-input area.

4. The touch input device according to claim 1, wherein the plurality of projections in the intermediate area, in the first input area, and in the non-input area each have a conical shape, and
in a plan view of the surface of the operation panel,
vertices of the plurality of projections in the first input area and in the non-input area are each at a center, and
vertices of the plurality of projections in the intermediate area are eccentric.

5. The touch input device according to claim 4, wherein the vertices of the plurality of projections in the intermediate area are eccentric to the first input area and away from the non-input area.

6. The touch input device according to claim 5, wherein the vertices of the plurality of projections in the intermediate area are eccentric to be connectable by one zigzag imaginary line along an alignment of the plurality of projections in a plan view of the surface of the operation panel.

7. A touch input device comprising:
an operation panel including a first input area that accepts an input operation, a non-input area that accepts no input operation, and an intermediate area, the non-input area surrounding the first input area, the intermediate area being interposed between the first input area and the non-input area so as to surround the first input area; and
an input receiver that accepts at least an input to the first input area, wherein
the operation panel includes a plurality of regularly or randomly arranged projections on a surface of the operation panel in each of the first input area, the non-input area, and the intermediate area,
the plurality of projections in at least one of the intermediate area, the first input area, or the non-input area are in a shape different from a shape of the plurality of projections in other areas of the intermediate area, the first input area, and the non-input area,
the plurality of projections in the intermediate area, in the first input area, and in the non-input area each have a conical shape, and
distal ends of the plurality of projections in the intermediate area have a curvature radius smaller than a curvature radius of distal ends of the plurality of projections in the first input area and in the non-input area.

8. The touch input device according to claim 7, wherein in a plan view of the surface of the operation panel,
vertices of the plurality of projections in the first input area and in the non-input area are each at a center, and
vertices of the plurality of projections in the intermediate area are eccentric.

9. The touch input device according to claim 8, wherein the vertices of the plurality of projections in the intermediate area are eccentric to be connectable by one zigzag imaginary line along an alignment of the plurality of projections in a plan view of the surface of the operation panel.

10. The touch input device according to claim 1, wherein the plurality of projections in the intermediate area, in the first input area, and in the non-input area each have a columnar shape, and
edges of distal ends of the plurality of projections in the intermediate area closer to the first input area have a curvature radius smaller than a curvature radius of edges of distal ends of the plurality of projections in the first input area and the non-input area.

11. The touch input device according to claim 1, wherein the plurality of projections in the first input area and in the non-input area are arranged continuously, and
the plurality of projections in the intermediate area are arranged continuously or at a certain interval.

12. The touch input device according to claim 1, wherein at least one of the first input area, the non-input area, or the intermediate area is light-transmissive.

13. The touch input device according to claim 1, wherein the surface of the operation panel is matte.

14. The touch input device according to claim 2, wherein the plurality of projections in the first input area and the plurality of projections in the non-input area are in a same shape.

15. A touch input device comprising:
an operation panel including a first input area that accepts an input operation, a non-input area that accepts no input operation, and an intermediate area, the non-input area surrounding the first input area, the intermediate area being interposed between the first input area and the non-input area so as to surround the first input area; and
an input receiver that accepts at least an input to the first input area, wherein
the operation panel includes a plurality of regularly or randomly arranged recesses on a surface of the operation panel in each of the first input area, the non-input area, and the intermediate area,
the plurality of recesses in at least one of the intermediate area, the first input area, or the non-input area are in a shape different from a shape of the plurality of recesses in other areas of the intermediate area, the first input area, and the non-input area, the intermediate area accepts an input operation, and the touch input device further comprises a second input area that accepts an input operation and is interposed between the intermediate area and the non-input area.

16. The touch input device according to claim 15, wherein the plurality of recesses in the intermediate area are different from the plurality of recesses in the first input area and the plurality of recesses in the non-input area, and the plurality of recesses in the first input area and the plurality of recesses in the non-input area are in a same shape.

* * * * *